US008792674B2

(12) United States Patent
Slobodan et al.

(10) Patent No.: US 8,792,674 B2
(45) Date of Patent: Jul. 29, 2014

(54) METHOD FOR ENCODING AND SIMULTANEOUSLY DECODING IMAGES HAVING MULTIPLE COLOR COMPONENTS

(75) Inventors: Cvetkovic Slobodan, Lake Worth, FL (US); Thomas C. Alasia, Wellington, FL (US); Alfred J. Alasia, Royal Palm Beach, FL (US); Cary Quinn, West Palm Beach, FL (US)

(73) Assignee: Graphic Security Systems Corporation, Lake Worth, FL (US)

( * ) Notice: Subject to any disclaimer, the term of this patent is extended or adjusted under 35 U.S.C. 154(b) by 161 days.

(21) Appl. No.: 13/409,323

(22) Filed: Mar. 1, 2012

(65) Prior Publication Data
US 2012/0163714 A1 Jun. 28, 2012

Related U.S. Application Data

(63) Continuation-in-part of application No. 13/270,738, filed on Oct. 11, 2011, now Pat. No. 8,682,025.

(60) Provisional application No. 61/447,878, filed on Mar. 1, 2011, provisional application No. 61/447,886, filed on Mar. 1, 2011, provisional application No. 61/391,843, filed on Oct. 11, 2010, provisional application No. 61/461,224, filed on Jan. 14, 2011.

(51) Int. Cl.
*G06K 9/00* (2006.01)
*H04N 1/40* (2006.01)

(52) U.S. Cl.
USPC .......................... 382/100; 382/235; 358/3.28

(58) Field of Classification Search
USPC ......... 382/100, 112–124, 162–168, 173, 181, 382/191, 219, 232, 254, 274, 276, 305, 312, 382/235, 294; 358/3.28, 1.15; 713/168; 283/73
See application file for complete search history.

(56) References Cited

U.S. PATENT DOCUMENTS

| 3,937,565 | A | 2/1976 | Alasia |
| 4,659,113 | A | 4/1987 | Muller et al. |
| 5,708,717 | A | 1/1998 | Alasia |
| 5,772,250 | A | 6/1998 | Gasper |
| 5,788,285 | A | 8/1998 | Wicker |

(Continued)

OTHER PUBLICATIONS

Ostromoukhov et al., "Artistic screening", Proceedings of the 22nd Annual Conference on Computer Graphics and Interactive Techniques SIGGRAPH (1995).

*Primary Examiner* — Seyed Azarian
(74) *Attorney, Agent, or Firm* — Novak Druce Connolly Bove + Quigg, LLP

(57) ABSTRACT

A method is provided for encoding a latent image having at least two color components into a visible image. A first and second image associated with first and second color components, respectively, are generated. The first image has a first pattern of elements and the second image has a second pattern of elements that are manipulated based on a corresponding color component provided in the latent image. A first and a second angle are assigned to the first image and the second image, respectively. The first image and second image are aligned by orienting the first pattern of elements according to the first angle and second angle, respectively. The aligned first image and second image are superimposed to render an encoded image that is decoded using a decoder that simultaneously display the first color component and the second color component of the latent image to present a color composite image.

20 Claims, 20 Drawing Sheets

(56) References Cited

U.S. PATENT DOCUMENTS

| | | |
|---|---|---|
| 5,995,638 A | 11/1999 | Amidror et al. |
| 5,999,280 A | 12/1999 | Huang |
| 6,104,812 A | 8/2000 | Koltai et al. |
| 6,859,534 B1 | 2/2005 | Alasia |
| 6,980,654 B2 | 12/2005 | Alasia et al. |
| 6,983,048 B2 | 1/2006 | Alasia et al. |
| 6,985,607 B2 | 1/2006 | Alasia et al. |
| 7,114,750 B1 | 10/2006 | Alasia et al. |
| 7,253,917 B2 * | 8/2007 | Umeda et al. ................. 358/1.15 |
| 7,315,629 B2 | 1/2008 | Alasia et al. |
| 7,341,200 B2 | 3/2008 | Alasia et al. |
| 7,366,301 B2 | 4/2008 | Huang et al. |
| 7,386,177 B2 | 6/2008 | Alasia et al. |
| 7,412,073 B2 | 8/2008 | Alasia et al. |
| 7,421,581 B2 * | 9/2008 | Alasia et al. .................. 713/168 |
| 7,466,876 B2 * | 12/2008 | Alasia ........................... 382/294 |
| 7,487,915 B2 | 2/2009 | Alasia et al. |
| 7,512,248 B2 | 3/2009 | Smith |
| 7,512,249 B2 | 3/2009 | Alasia et al. |
| 7,512,280 B2 | 3/2009 | Alasia et al. |
| 7,551,752 B2 | 6/2009 | Alasia et al. |
| 7,558,401 B2 | 7/2009 | Alasia et al. |
| 7,630,513 B2 | 12/2009 | Alasia et al. |
| 7,654,580 B2 | 2/2010 | Alasia et al. |
| 7,673,806 B2 | 3/2010 | Alasia et al. |
| 7,773,749 B1 | 8/2010 | Durst et al. |
| 7,796,753 B2 | 9/2010 | Alasia et al. |
| 7,819,324 B2 | 10/2010 | Alasia et al. |
| 8,009,329 B2 * | 8/2011 | Bala et al. ..................... 358/3.28 |
| 2003/0179412 A1 * | 9/2003 | Matsunoshita ............... 358/3.28 |
| 2007/0098961 A1 | 5/2007 | McCarthy et al. |
| 2007/0267865 A1 * | 11/2007 | Wicker et al. ................... 283/73 |
| 2008/0044015 A1 | 2/2008 | Alasia |
| 2008/0292129 A1 | 11/2008 | Fan et al. |

* cited by examiner

Component Image 1  Component Image 2

Component Image 1  Component Image 2

Composite Image

Lenticular Lens Element Patterns

Fly's Eye Lens Element Patterns

METHOD FOR ENCODING AND SIMULTANEOUSLY DECODING IMAGES HAVING MULTIPLE COLOR COMPONENTS

CROSS REFERENCE TO RELATED APPLICATIONS

This application claims priority to U.S. Provisional Application 61/447,878, filed Mar. 1, 2011 and U.S. Provisional Application 61/447,886, filed on Mar. 1, 2011, the complete disclosures of which are incorporated herein by reference in their entirety. This application is a continuation-in part of U.S. application Ser. No. 13/270,738 filed on Oct. 11, 2011 now U.S. Pat. No. 8,682,025, which claims priority to U.S. Provisional Application 61/391,843, filed Oct. 11, 2010 and U.S. Provisional Application 61/461,224, filed on Jan. 14, 2011, the complete disclosures of which are incorporated herein by reference in their entirety. This application is directed to subject matter related to the technology disclosed in the following U.S. Patents, the complete disclosures of which are incorporated herein by reference in their entirety: U.S. Pat. No. 5,708,717, issued Jan. 13, 1998, U.S. Pat. No. 7,466,876, issued Dec. 16, 2008, U.S. Pat. No. 7,512,249, issued Mar. 31, 2009; and U.S. Pat. No. 7,512,249, issued Mar. 31, 2009.

FIELD OF THE INVENTION

The invention relates generally to the field of counterfeit protection, and more particularly to the field of electronic and printed document protection using encoded images.

BACKGROUND OF THE INVENTION

Document falsification and product counterfeiting are significant problems that have been addressed in a variety of ways. One approach has been using latent or hidden images applied to or printed on articles to be protected. These latent or hidden images are generally not viewable without the assistance of specialized devices that render them visible.

One approach to the formation of a latent image is to optically encode the image so that, when applied to an object, the image can be viewed through the use of a corresponding decoding device. Such images may be used on virtually any form of printed document including legal documents, identification cards and papers, labels, currency, and stamps. They may also be applied to goods or packaging for goods subject to counterfeiting.

Articles to which an encoded image is applied may be authenticated by decoding the encoded image and comparing the decoded image to an expected authentication image. The authentication image may include information specific to the article being authenticated or information relating to a group of similar articles (e.g., products produced by a particular manufacturer or facility). Production and application of encoded images may be controlled so that they cannot easily be duplicated. Further, the encoded image may be configured so that tampering with the information on the document or label is readily apparent.

In existing systems, when an encoded image is decoded, the hidden content is revealed as a monochrome image. Alternatively, the hidden content is revealed as an image that has the exact same colors provided in each location of the printed artwork without the decoding device. While the hidden content may appear brighter or darker compared to the visible content, the image follows the colors present in the visible content. Using prior art methods, it is not possible to design the color appearance of the hidden content and to encode it in such way that there is no visual correlation between colors observable with naked eye in the visible content and colors in the decoded hidden content. What is needed is a process and method of encoding and decoding hidden images using two or more color components.

SUMMARY OF THE INVENTION

The present disclosure provides a computer-implemented method and system for encoding a latent image into a visible image based on encoding parameters, the latent image having two or more color components that are simultaneously revealed upon placing a decoder over an encoded image. The decoder includes decoding parameters that match the encoding parameters. The method generates a first image associated with a first color component and a second image associated with a second color component, the first image having a first pattern of elements and a second pattern of elements that are manipulated based on corresponding color components of the latent image.—A first angle is assigned to the first image and a second angle is assigned to the second image. The first image and second image are aligned by orienting the first pattern of elements according to the first angle and second angle, respectively. The aligned first image and the aligned second image are superimposed to render the encoded image.

The present disclosure further provides a computer-implemented method and system for decoding a composite image having a latent image embedded therein. The decoded latent image includes first and second color separations that are oriented at different angles within the composite image, the first and the second color separations being simultaneously revealed by placing a decoder over the composite image. The method includes determining a first angle associated with the first color separation of the latent image and determining a second angle associated with the second color separations of the latent image. A first color component is assigned to the first color separation based on the determined first angle and a second color component is assigned to the second color separation based on the determined second angle. A decoder is provided to simultaneously display the first color component and the second color component of the latent image in order to present a color composite image.

Another aspect of the disclosure provides a multi-layer decoder for decoding a composite image having a latent image embedded therein. The latent image is encoded into the composite image based on a plurality of encoding parameters and includes first and second color separations that are oriented at different angles within the composite image. The first and the second color separations are simultaneously revealed by placing the multi-layer decoder over the composite image. The multi-layer decoder includes a first layer having first elements oriented along a first angle associated with the first color separation of the latent image. A second layer is affixed to the first layer; the second layer includes second elements that oriented along a second angle associated with the second color separation of the latent image. The first layer and the second layer are being positioned relative to each other so that the first layer and the second layer simultaneously reveal the first color component and the second color component of the latent image to present a color composite image.

Yet another aspect of the disclosure provides a single-layer decoder for decoding a composite image having a latent image embedded therein. The latent image is encoded into the composite image based on a plurality of encoding parameters and includes first and second color separations that are oriented at different angles within the composite image. The first and the second color separations are simultaneously revealed by placing the single-layer decoder over the composite image. The single-layer decoder includes first elements that are oriented along a first angle associated with the first color separation of the latent image. Second elements are provided and are oriented along a second angle associated with the second color separation of the latent image. The first elements and the second elements are positioned relative to each other so that the first elements and the second elements simultaneously reveal the first color component and the second color component of the latent image to present a color composite image.

Yet another aspect of the disclosure provides a computer-implemented method for encoding two latent images into a visible image based on encoding parameters, the latent images having different content that is associated with two or more color components to generate a rainbow effect that is revealed upon placing a decoder over an encoded image. The decoder includes decoding parameters that match the encoding parameters. The method includes generating a first image associated with a first color component, the first image having a first pattern of elements that are manipulated based on a corresponding color component provided in the latent image. A second image associated with a second color component is generated, the second image has a second pattern of elements that are manipulated based on a corresponding color component provided in the latent image, the second latent image includes different content than the first latent image. The first image and the second image are superimposed to render the encoded image, the encoded image being visually similar to the visible image when viewed with an unaided eye.

BRIEF DESCRIPTION OF THE DRAWINGS

The invention can be more fully understood by reading the following detailed description together with the accompanying drawings, in which like reference indicators are used to designate like elements, and in which.

DETAILED DESCRIPTION OF THE INVENTION

Figure 1:
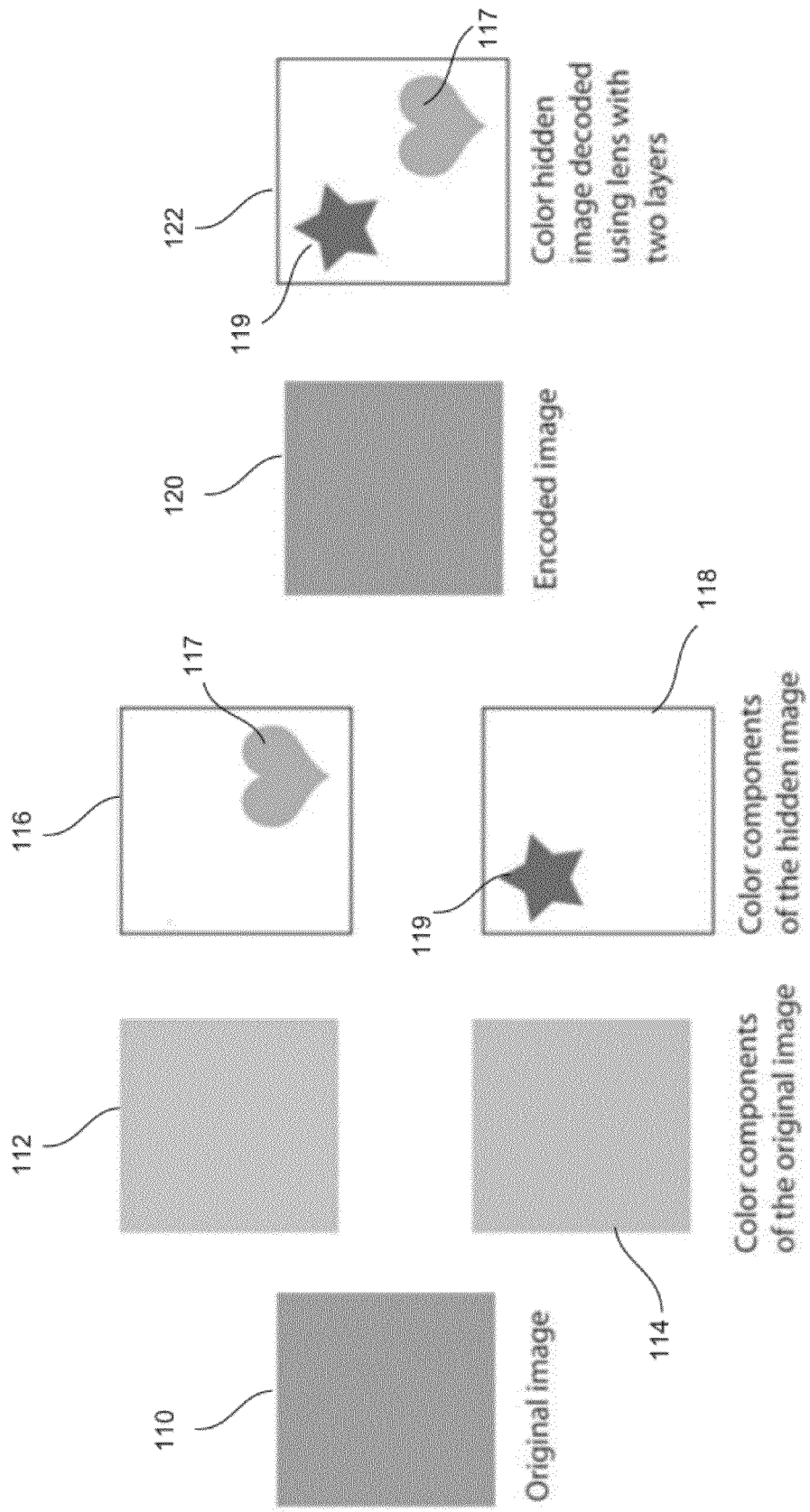
FIG. 1 illustrates an example of encoding a latent image having two color components into a visible image according to an embodiment of the invention.

The disclosure provides methods of encoding and decoding images having color information. The image (hereinafter "composite image") may include two or more latent images that are embedded into a visible image. Alternatively, the composite image may include a latent image having two or more color separations embedded into the visible image. The composite image is placed upon articles that are subject to alteration, falsification and counterfeiting.

In this disclosure, a "latent image" refers to an image that is manipulated and hidden within the visible image. When the composite image is generated from the latent image and the visible image, the latent image cannot be discerned from the composite image by a human eye, without the aid of a latent image rendering device ("rendering device") or a decoding device. One or more latent images may be hidden in the visible image so that the latent image is difficult to discern without a rendering device. In an alternative example, the latent image may be visible, but not readable, because latent image content is systematically scrambled within the composite image or otherwise manipulated. This disclosure provides techniques for encoding a latent image having two or more color components into a visible image. This disclosure further provides techniques for encoding two or more latent images generated using different color components, into a visible image. The disclosure further provides techniques for simultaneously decoding two or more color components associated with the latent images. Still further, the disclosure provides digital techniques for decoding latent images having color separation information, such as differing orientation angles or other color separation information.

As described herein, latent images may be encoded into visible images using optical cryptography and optical steganography. In this disclosure, the term "optical cryptography" describes a process by which a latent image is "scrambled" (i.e. made unreadable) until a matching optical decoder is placed over the composite image to descramble the hidden content.

According to one example, the latent images may be encoded into the visible image at selected angles for each of the two or more color components. For half tone latent images, the half tone latent images associated with the two or more color components may be encoded into the visible image at one or more selected frequencies. The selected frequency may be the same for each of the two or more color components. Alternatively, the selected frequency may be different for each of the two or more color components. Within each color component, phase shifting techniques may be applied to embed latent image into the visible image. For example, half tone segment or line gratings may be phase shifted to account for density patterns of the latent image at a particular location. The rending device may include elements that are configured to correspond to the encoding parameters. For example, half tone encoding parameters may include the selected encoding angles and encoding frequencies. The rendering device may further provide color depths of the latent image by decoding the density patterns of the latent image color components. Thus, the latent image becomes visible when the rendering device is placed over the composite image. One of ordinary skill in the art will readily appreciate that techniques other than phase shifting may be provided to encode the latent images.

FIG. 1 illustrates an example for encoding a latent image into a visible image using two color components. Visible image 110 includes a first color component 112 and a second color component 114. Latent image 116 include a heart shaped item 117 generated using a first color component. Latent image 118 include a star shaped item 119 generated using a second color component. The resulting composite image 120 includes the latent images 116 and the latent image 118 embedded into the visible image 110. Decoded image 122 is revealed upon decoding the resulting composite image 120. As discussed below, decoded image 122 shows both the heart shaped item 117 from latent image 116 and the star shaped item 119 from latent image 118, displayed simultaneously in their corresponding color components.

In FIG. 1, the color latent image 116 and the color latent image 118 are encoded separately into the corresponding color component of the visible image 110. Encoding for the first color component may be performed by shifting the first color component halftone image by half of the halftone frequency at sections where there is content inside the first color component of the latent image. For example, the first screen frequency may be 200 lines per inch and the first screen may be oriented at 75 degrees from a horizontal axis. The encoding of the second color component may be performed by shifting the halftone image at sections where there is content inside the second color component of the latent image. The second screen frequency may be 200 lines per inch and the second screen may be oriented at 15 degrees from the horizontal axis. As discussed below, the color latent image may be decoded using two layered rendering device having a first layer that matches halftone parameters of the first screen and a second layer that matches halftone parameters of the second screen. For example, the first screen may correspond to cyan and the second screen may correspond to magenta.

Figure 2:
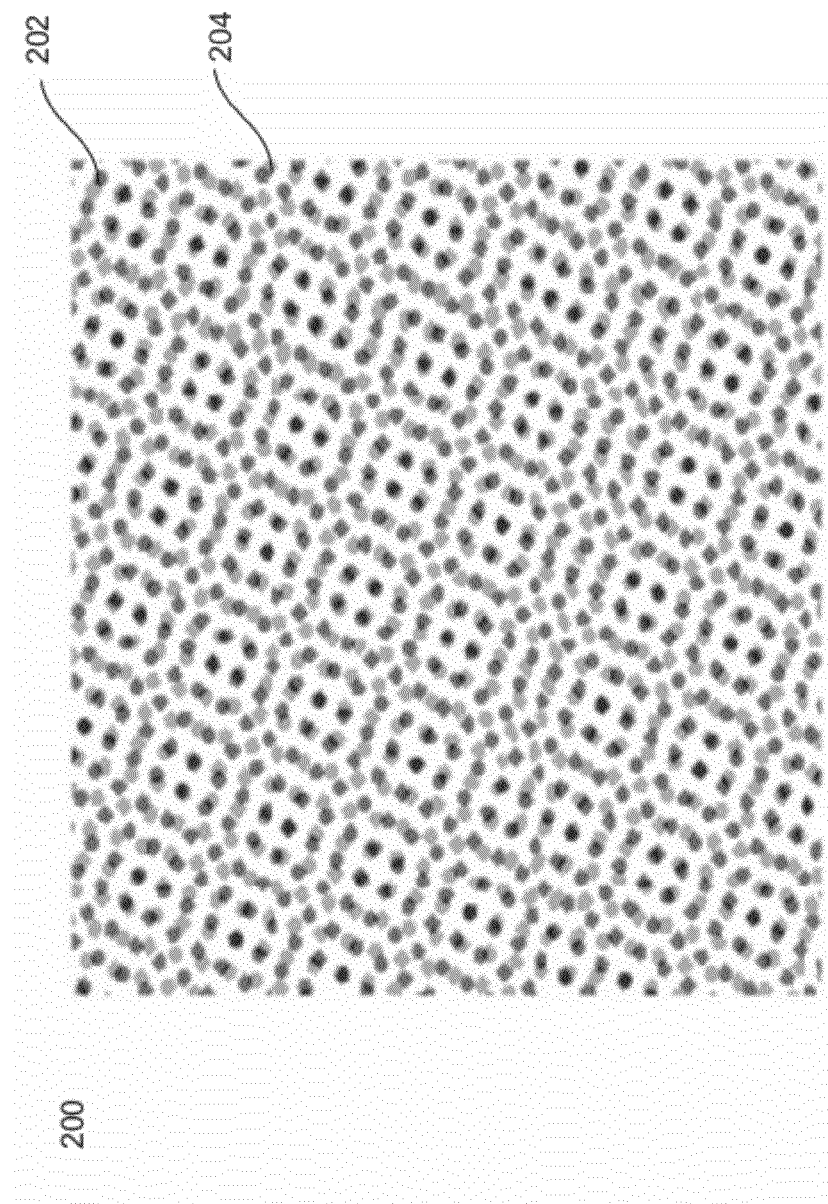
FIG. 2 illustrates an overlay of halftone screens according to an embodiment of the invention.

FIG. 2 illustrates an overlay of halftone screens 200. The overlay 200 depicts an equal amount of the manipulation of the halftone screens 202, 204 at all points having content of the color components of the latent images. As a result, the decoded latent images will include a consistent or same color intensity level at all positions. This reduces a depth of each color components to two levels. A variation of this method may be performed to encode the color latent images with more tonal levels for each color component. The quality of the decoded color latent image may be improved by preserving a color depth of the hidden latent. In other words, rather than providing a limited number of phase shifts, such as a full phase shift or no phase shift at a given spot in the decoded latent image, the color component information may be preserved with finer granularity during the encoding process.

Figure 3:
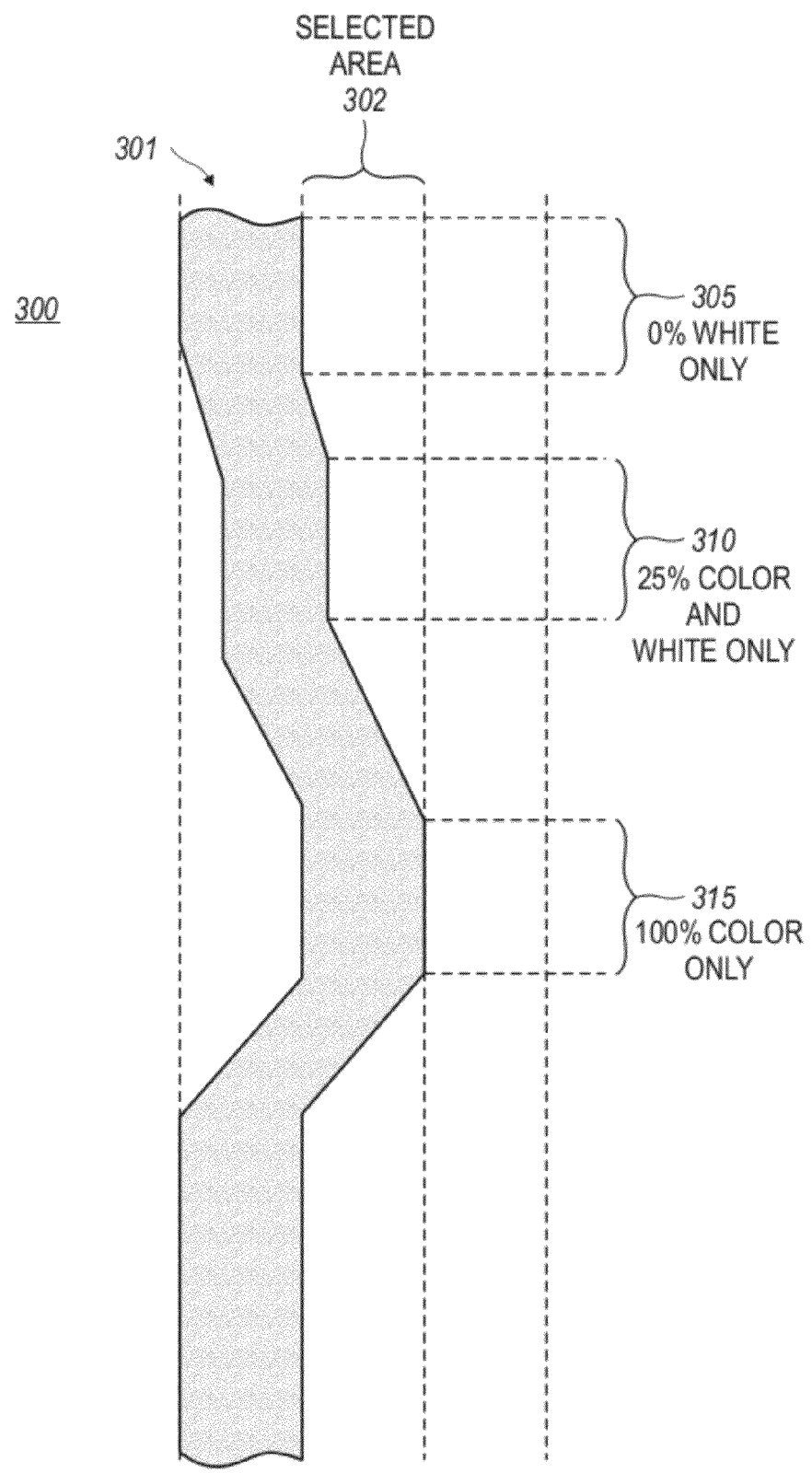
FIG. 3 illustrates a phase shifted segment for a half tone image according to an embodiment of the invention.

FIG. 3 illustrates an example of phase shifting a segment 301 for a halftone image to preserve color components using three phase shifts during the encoding process. One of ordinary skill in the art will appreciate that any number of phase shifts may be used to represent color density values between 0-100%. Shift areas are shown, including a partial shift area 310 for 25% color density and a full shift area 315 for 100% color density at sections where there is content inside a corresponding color component of the latent image. During a shift, the segment 301 is moved into a selected area 302 located adjacent to the segment 301. A no shift area 305 is shown for a latent image section that does not include content.

Expanding on the concept of FIG. 3, an amount of segment shifting may be commensurate to a density value of the latent image at the given spot. For example, if the density value is 100%, a maximum shift of the encoding segment (usually half of the decoder period) may be applied; if the density value is 50%, the segment can be shifted by 50% of the maximum possible shift; if the density value is 25%, the segment can be shifted by 25% of the maximum possible shift; and so forth. One of ordinary skill in the art will appreciate that the shifting value may be any increment, such as 10%, 1%, 0.1%, 0.01%, or the like.

An optical decoder will show areas with different amounts of shifting as having different densities, thus giving a color depth to the decoded latent image. According to one example, a maximum color depth and a maximum number of colors that may be encoded may be determined by the ratio of printing resolution and encoding resolution. For example, if an image is printed with 2400 dots per inch and if the image is encoded with 200 lines per inch, a width of the encoding element will be 2400/200=20 dots. The full density of the hidden image inside the encoded image is usually achieved when the encoding element is shifted by one half of its width, i.e. by 10 dots. Thus, by applying shifts of 1, 2, ..., 10 pixels, ten 10 different density levels may be encoded for each hidden image color separation. This results in a total of 10^4 different colors for a four color printing press. This method may be used to encode high quality color images into the visible image. According to one example, the decoded latent image may appear with improved quality if this method is used with a monochrome latent image. This is due to the fact that the decoded image may be shown with multiple brightness levels, instead of a binary image. The above described concepts also apply to the scrambling examples described below.

In this disclosure, the term "optical steganography" describes a process where a plain or cryptographically modified image is used to reform the visible image by applying different transformations. For example, the segment line grating associated with the color components may be shifted to match a pattern of the rendering elements provided on the rendering device. The latent image remains invisible to the unaided eye until decoded by placing a matched rendering device over the visible image. Various techniques may be used to encode and decode latent images and visible images.

As described in detail below, encoded latent images may be optically decoded using a software decoder or a rendering device, such as a physical lens. The rendering device may include elements arranged in linear and non-linear patterns. The latent images or latent image color components may be encoded and decoded using a segment frequency matching a segment frequency of the rendering device or software decoder. For example, the latent image segments are distorted in selected areas to hide the latent image when viewed with the unaided eye. Encoded latent images may be produced in digital form as described in U.S. patent application Ser. No. 13/270,738, filed on Oct. 11, 2011, or in U.S. Pat. No. 5,708,717, issued Jan. 13, 1998, the contents of both of which are incorporated herein by reference in their entirety. Encoded latent images may be produced in analog form using specialized photographic equipment as disclosed in U.S. Pat. No. 3,937,565, the content of which is incorporated herein by reference in its entirety.

To enable image authentication, the encoded latent image is embedded within visible images, such as photographs, tint-like images, documents, or the like, to form composite images. The composite image may be printed on, affixed or associated with articles, including documents, identification cards, passports, labels, products, product packaging, currency, stamps, holograms, or the like. According to one example, the encoded composite images may be produced using visible inks, invisible inks, special inks, toner, dye, pigment, varnish, a transmittent print medium, or the like. Alternatively, the encoded composite images may be embossed, debossed, molded, laser etched, engraved, or the like, and affixed to articles. The composite image serves to authenticate articles and promotes anti-counterfeiting efforts.

This disclosure describes various techniques for encoding multiple latent images or a latent image having two or more color components into a corresponding visible image. Techniques described by the same assignee for encoding latent images into a visible image include (1) combining multiple components to create a composite image, such as described in U.S. patent application Ser. No. 13/270,738, filed on Oct. 11, 2011, which is hereby incorporated by reference in its entirety; (2) using cryptographic and steganographic methods, such as described in U.S. Pat. No. 7,796,753, issued Sep. 14, 2010, U.S. Pat. No. 7,466,876, issued Dec. 16, 2008, U.S. Pat. No. 6,859,534, issued Feb. 22, 2005, and U.S. Pat. No. 5,708,717, issued Jan. 13, 1998, which are hereby incorporated by reference in their entirety; and (3) using stenographic methods, such as described in U.S. Provisional Application 61/447,886, filed on Mar. 1, 2011, which this application claims priority to and which is hereby incorporated by reference in its entirety.

Applying a Single Layered Decoding Lens to Decode a Composite Color Image Created by Combining Multiple Component Images According to one example, an image to be encoded or scrambled is broken into image portions or component images that may include tonal complements of one another, for example. The tonal component images may be balanced around a selected feature, such as a color shade or other feature. The component images are sampled based on a selected parameter, such as frequency, and the sampled portions may be configured to provide a composite image, which appears to the unaided eye to be a single tone image, for example. The single tone may be the selected color shade. As will be discussed herein, the samples may be arranged according to a parameter defined in a corresponding decoder or rendering device that may be used to view the encoded, scrambled or latent image.

In one example, image portions may be extracted from at least two different images. The different images each may contribute image portions that are encoded or scrambled to render the composite image. The image portions from at least two different images may be encoded or scrambled together to form a single composite image that can be decoded to reveal one or more hidden images.

According to one example, one or more latent images can be "hidden" within a visible image by constructing a composite image as described herein. The composite image may be transformed to a visible image using rendering technology such as halftone screens, stochastic methods, dithering methods, or the like. In another example, one or more latent images may be hidden within the visible image by creating a composite image that is derived from samples of component images obtained from the visible image. The composite image is created by obtaining a complementary inverse image portion for each corresponding image portion. The image portion and the complementary inverse image portion may be patterned in pairs according to a parameter, such as frequency, and multiple pairs may be positioned adjacent to each other to render the composite image.

According to one example, encoding is performed by overlaying the latent image onto the visible image to identify visible image content areas that correspond to latent image content areas. At these identified visible image content areas, the inverse image content and the corresponding image content are exchanged or swapped. The encoded composite image is obtained by applying this technique to each of the image portion and the complementary inverse image portion pairs over the composite image. This technique enables images to be encoded without dividing the latent image into color separations. Thus, this disclosure supports encoding images by modifying a single parameter of the composite image, such as a tone parameter.

After the composite image is digitally generated, the composite image may be rendered using halftone screens, for example. Since the latent image is encoded using a desired frequency for the image portion and the complementary inverse image portion pairs, the halftone screens may be printed at a halftone frequency that is a larger than the desired frequency of the image portion and the complementary inverse image portion pairs. For example, the halftone frequency may be at least two times larger than the desired frequency of the image portion and the complementary inverse image portion pairs. Furthermore, the halftone screen angles may be selected to avoid Moiré effects, such as between the printing screen and the encoding element. One of ordinary skill in the art will appreciate that various larger multiples of halftone frequency may be used without causing interference to the composite image.

One example for generating the composite image includes digitally encoding a color latent image using an image portion and the complementary inverse image portion to generate an encoded tint image. Another example for generating the composite image includes digitally encoding a darkened and brightened version of the color latent image. An alternative technique for blending colors into the composite image include transforming a color image into a color space that separates the image into intensity and color components, such as Lab, Yuv, or HSI color space. Other color spaces may be used.

After the composite images are digitally encoded, the composite image may be printed using standard printing techniques, such as halftone screen printing, stochastic screen printing, and dither printing, among other printing techniques. As discussed herein, if halftone printing is used, the halftone frequency may be set to a frequency that is larger than the frequency of the rendering device or decoder frequency. For example, the halftone frequency may be at least two times larger than the frequency of the rendering device or decoder frequency. One of ordinary skill in the art will appreciate that various larger multiples of halftone frequency may be used without causing interference to the composite image.

As discussed herein, an encoded image is provided in the form of a composite image constructed from multiple component images. This disclosure provides methods of using a multiple component approach for hiding information into the composite image.

The use of component images takes advantage of the fact that the human eye is unable to discern tiny details in an encoded image. The encoded image is usually a printed or otherwise displayed image. The human eye tends to merge together fine details of the printed or displayed image. As a result, printers are designed to take advantage of this human tendency. Printers produce multitudes of tiny dots or other structures on a printing medium, such as a substrate, paper, plastic, or the like. The size of individual printed dots can be measured as small as thousands of an inch and are not perceived by unaided human vision. The human eye averages the dot patterns to create a color shade. The dot size or the dot density, for example, will determine the perceived color shade. If the printed dot sizes are bigger, or if the dots are printed closer together, the eye will perceive a darker shade. If the printed dot sizes are smaller, or if the dots are printed further apart, the eye will perceive a lighter shade.

According to one example, the latent image can be broken into tonally complementary component images. In this disclosure, the term "tonally complementary" describes balancing the component images around a particular color. Therefore, if corresponding elements, such as elements from corresponding locations on the component images are viewed together, the eye will perceive the color around which the component tones are balanced. The terms tonal values or tonal shade mean either intensity value or color value.

Figure 4A:
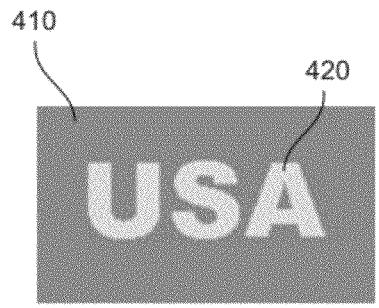
FIGS. 4A-4C are a schematic representation of component images used to produce a composite image according to an embodiment of the invention.
Figure 4A:
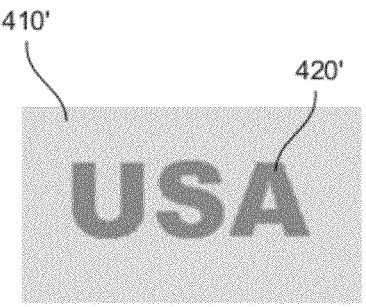

FIG. 4A shows first and second component images defining a latent image. In component image 1, a solid background 410 is provided with a first tonal shade that surrounds an area 420. A second tonal shade is provided to define the latent image depicted by the block letters "USA". In component image 2, the tonal values are reversed in comparison to component image 1. The second tonal shade covers a background area 410' and the area 420' defining the block letters "USA" includes the first tonal shade. The first and second tonal shades are balanced around a single shade so that if the component images are composite, the naked eye will perceive only the single shade and the block letters "USA" may not be discernible. Each component image may be referred to as a "phase" of the original image.

According to one example, each phase can be divided into small elements according to a pattern corresponding to a pattern of the decoder or rendering device. For example, the rendering device patter may be defined by lens elements. The lens elements may be linear elements (straight or curved) or segments that correspond to the lens elements of a lenticular lens, for example. Alternatively, the lens elements may be formed in a matrix of two dimensional elements corresponding to a multiple-element lens, such as a fly's eye lens. In the example shown in FIG. 4B, the component images are divided into an array of square elements 430, 430'. The square elements 430, 430' may correspond in size and position to the elements of a fly's eye lens, for example. The component element pattern may include a frequency that corresponds to the frequency (or one of the element frequencies) of the lens elements. The component element pattern may have the same frequency (or frequencies for a multi-dimensional pattern) as the lens element frequency (or frequencies). Alternatively, the component element pattern may have a frequency that is a multiple of the of the lens element frequency.

Figure 4B:
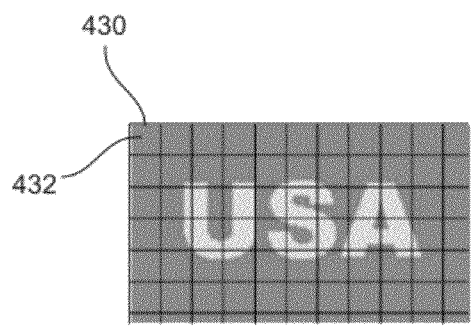
Figure 4B:
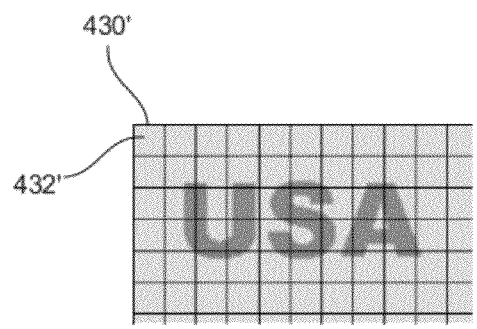
Figure 4C:
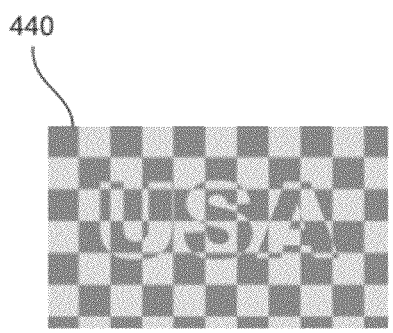

As shown in FIG. 4B, the elements 430, 430' corresponding to the component image 1 and the component image 2 may be systematically divided into subelements 432, 432'. Samples may be taken from the subelements 432, 432' and may be combined to form a composite image 440 that has an average tone that matches that of the shade around which the component image 1 and the component image 2 are balanced. As illustrated in FIG. 4C, the elements and subelements are so large that the latent image is readily apparent. It will be understood, however, that if the elements of the composite images are sufficiently small, the human eye will merge the elements together so that only a single uniform color shade is perceived.

When a single uniform color shade or tone is viewed by the unaided eye, the composite image may appear not to include content. However, the latent images become visible when a decoder or rendering device is positioned over the composite image such that features of the decoder include a frequency, a shape and a geometrical structure that correspond to the pattern of the subelements 432, 432'. In practice, the latent images are decoded when the decoder or rendering device is properly oriented on the composite image 440. The decoder features are configured to separately extract portions of the composite image contributed by each of the component image 1 and the component image 2. This allows the latent image to be viewed by a human observer looking through the decoder. The decoder features may include magnifying properties and the particular component image viewed by the observer may change depending on an angle of view through the decoder. For example, from a first angle of view, the viewer may see an image having light background with a dark inset. From a second angle of view, the viewer may see an inverse image having dark background with a light inset.

The example component images illustrated in FIGS. 4A-4C include two color shades. It will be understood, however, that the number of color shades is unlimited. According to one example for producing a single apparent tonal value in the composite image, the various color shades provided in the two component images may be balanced around the single tonal value. Alternatively, the component images may be balanced around multiple tonal values, in which case, the resulting composite image will have multiple apparent tonal values.

According to one example illustrated in FIGS. 4A-4C, the composite image may be designed to work with individual lenses, such as fly's eye lenses, arranged in an array, such as a square or rectangular grid. It will be understood, however, that the lens features may be formed in virtually any pattern including a symmetric pattern, an asymmetric pattern, a regularly spaced pattern, or an irregularly spaced pattern. Furthermore, the lens feature may be adapted to any shape. The size of the composite image elements may be determined by the features sizes of the decoding lens. As noted herein, the sampling frequency of the component images may be calculated to be a multiple of the feature frequency of the decoder. For example, the sampling frequency of the component image may be the same, twice, or three times the sampling frequency of the lens features.

In the example shown in FIG. 4C, the alternating portions of the component image form the composite image having a matrix pattern that appears as follows:

Component 1 Component 2 Component 1 Component 2
Component 1 Component 2 Component 2 Component 1
Component 2 Component 1 Component 2 Component 1
Component 1 Component 2 Component 1 Component 2
Component 1 Component 2 Component 2 Component 1
Component 2 Component 1 Component 2 Component 1
Component 1 Component 2 Component 1 Component 2
Component 1 Component 2 Component 2 Component 1
Component 2 Component 1 Component 2 Component 1

Figure 5A:
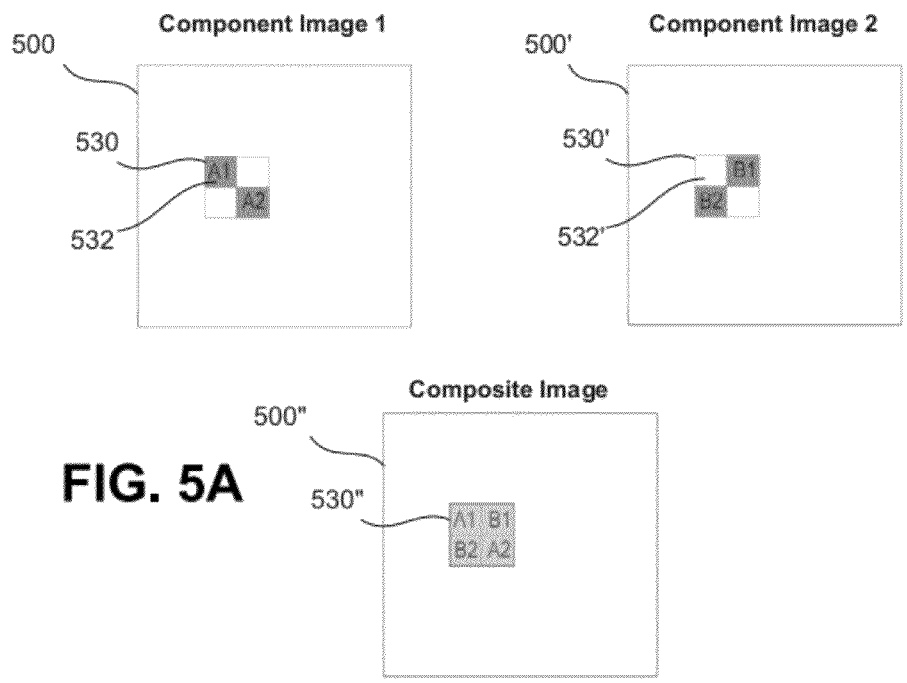
FIGS. 5A-5B are a schematic representation of component image elements produced in a method of producing a composite image according to an embodiment of the invention.
Figure 5B:
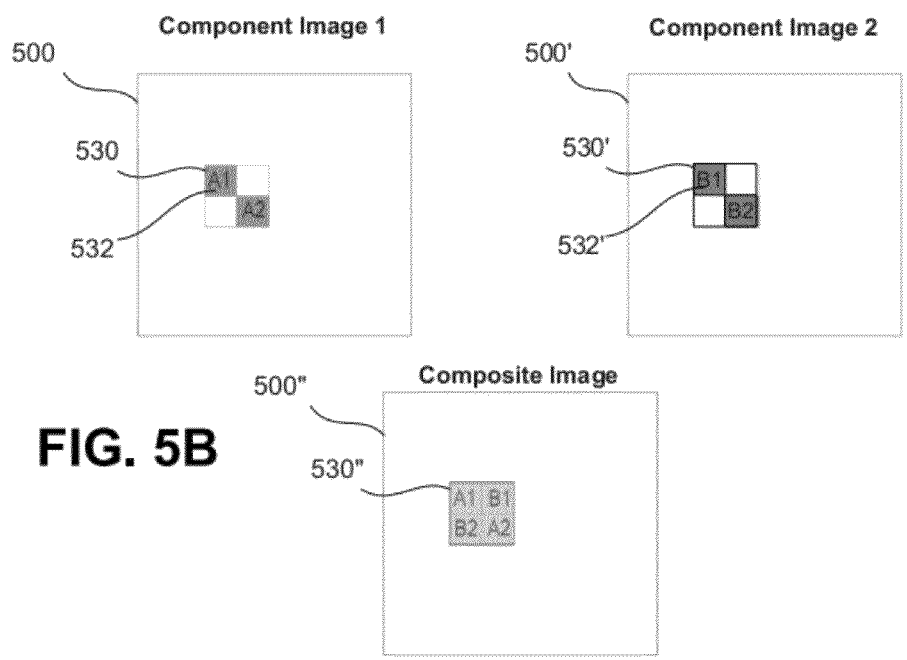

It will be understood that other systematic approaches may be utilized for collecting and ordering portions of the component images in order to form the composite image and/or the elements inside the composite image. FIGS. 5A and 5B, for example, illustrate an approach to collecting and ordering portions of the component images 500, 500' to form elements of the composite image 500". The component images 500, 500' may be constructed using tonal values that are balanced around one or more selected tonal values. The balanced values may be used to define a latent image.

In the examples illustrated in FIGS. 5A and 5B, the component images 500, 500' are divided into elements 530, 530' each having a 2×2 pattern of subelements 532, 532'. The pattern is similar to the pattern used in the example of FIG. 4C. It will be understood that while only a single exemplary element 530, 530' is shown for each component 500, 500', the disclosure supports dividing the entire composite image into a grid of such component images. As illustrated in FIG. 5A, diagonally opposed subelements A1 and A2 are taken from each element (or cell) 530 of the first component image 500. Similarly, the diagonally opposed subelements B1 and B2 are taken from the corresponding element 530' of the second component image 500'. The B1 and B2 portions may be selected so that they differ in exact location from the A1 and A2 portions, as shown in FIG. 5A. Alternatively, the B portions may be taken from the same locations as the A portions as shown in FIG. 5B. In either case, the selected portions are then used to construct a composite image 500". In the example of FIG. 5A, the subelements A1, A2, B1 and B2 all may be placed in the corresponding element 530" of the composite image 500' in the exact locations from which they were taken. In the example of FIG. 5B, the B subelements may be positioned in a slightly different location in the composite image from where they were taken in order to fill out the element 530". In both examples, however, the four subelements A1, A2, B1 and B2 are all taken from the same cell location to assure that the corresponding cell 530" in the composite image 500" will have the same apparent tonal value in either case.

It will be understood by those of skill in the art that the subelements 532, 532' may be shapes other than a square shape. For example, the subelements 532, 532' may include, but not limited to, any polygon, circle, semicircle, ellipse and combinations or portions thereof. The component elements 530, 530' could be divided into two or four triangles, for example. The component elements 530, 530' also may be formed as two rectangles that make up a square element. For images to be viewed using a fly's eye lens, the component elements (or portions thereof) can be sized and shaped to correspond to the shape of the decoder features. Any combination of subelement shapes can be used that, when combined, form the corresponding element shape. The disclosure contemplates mixing different shapes, as long as the desired tonal balance is maintained. Different sized subelements may also be used within a composite image. Even if a total area belonging to each of the image components are not equal, any disparity can be compensated by using a darker or lighter tone for one of the image components. For example, for a first image area at 50% having a 60% density associated with the first component and for a second image area at 50% having a 40% density associated with the second component will give a 50% overall tint. However, using a first image area at 75% having a 60% density associated with the first component and using a second image area at 25% having a 20% density associated with the second component will also be perceived as 50% overall tint density. Another approach includes using a different number of subelements from different components. For example, two subelements can be taken from the first component and four subelements can be taken from the second component, as long as the tonal balance is maintained. According to these examples, since two component images are provided, half of each component image is used to form the composite image.

Figure 6:
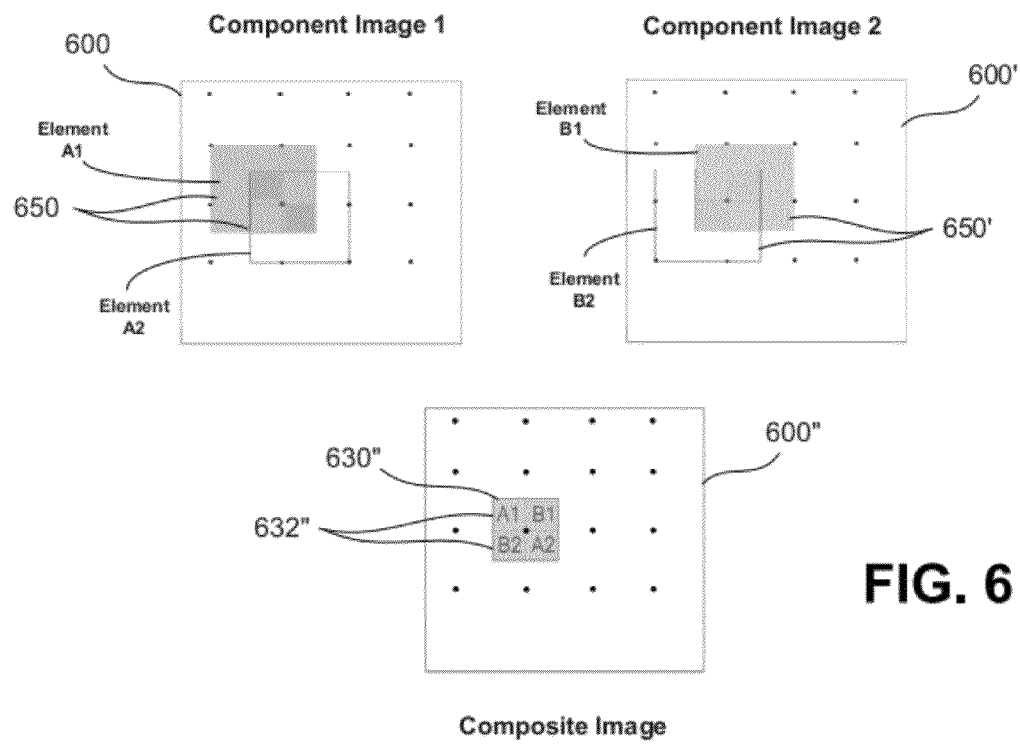
FIG. 6 is a schematic representation of component image elements produced in a method of producing a composite image according to an embodiment of the invention.

FIG. 6 illustrates an embodiment that produces a scrambling effect in the composite image. In this approach, overlapping sample portions are taken from the component images and the sample portions are reduced in size so as to form non-overlapping pieces or subelements of a composite image. The difference in sizes between the portions of the component image and the subelements of the composite image may be referred to as a zoom factor or subelement reduction factor. For example, for a zoom factor of three, the size of the portions of the component images would be three times larger than the size of the subelements of the composite image. In this example, the size of the portions of the component images are reduced in size three times before being inserted into the composite image.

FIG. 6 illustrates first and second component images 600, 600', which are used to construct a composite image 600". According to one example, overlapping elements 650, 650' are taken from corresponding component images 600, 600', reduced in size as a function of the zoom factor, and placed as subelements 632" within element 630" to form the composite image 600". It will be understood that although only two such subelements are shown for each component image (i.e., A1, A2, B1 and B2), the overlapping elements 650, 650' cover the entirety of the two component images 600, 600'. Each subelement is positioned based on the configuration and frequency of the decoder features and on the configuration of the subelements 632". In the embodiment shown in FIG. 7, the overlapping elements are centered on the locations of the subelements 632".

In FIG. 6, the shaded area identified as Element A1 in the first component image is shrunk down three times in each dimension to create subelement A1 of the composite image (i.e., a zoom factor of 3 is applied). Subelement A1 is centered on the position corresponding to the center of Element A1 in the component image. The large square identified as Element A2 is shrunk down three times in each dimension to obtain subelement A2 of the composite image 600", which is similarly centered on the location corresponding to the center of the Element A2. Similar operations were performed to obtain subelements B1 and B2 of the composite image 600".

Figure 7:
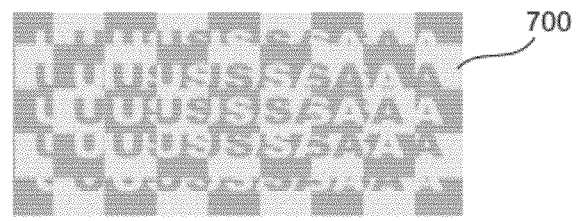
FIG. 7 illustrates a composite image produced in a method according to an embodiment of the invention.

The effect of using a zoom factor to create the composite image is illustrated in FIG. 7, which shows a composite image 700 formed from the component images in FIG. 4. The pattern of the elements and the subelements in the composite image 700 are configured to correspond to the features of a matching decoder. The composite image of FIG. 7 was formed using a zoom factor of 4, but it will be understood that the composite image may be formed using any zoom factor. Despite the scrambled appearance of the image portions that make up the composite image, placement of the matching decoder over the composite image results in the "reassembly" of the component images 410, 410' for viewing by an observer. It follows that the observer will see the latent image 420, 420' within the corresponding component images 410, 410'. According to one example, the latent images may appear to move or "float" when as the observer changes his angle of view through the decoder. This floating effect results from using the overlapping component portions that have been zoomed. The zoom effect causes the elements of the component images to spread into multiple parts of the composite image. By adjusting the angle of view, the decoder renders information from the multiple parts of the component image, thereby creating an illusion of floating. Generally, the bigger the zoom factor, the more pronounced the floating effect. On the other hand, by shrinking the portions of the component images by a zoom factor, the effective resolution of the component images may be decreased when seen through the decoding lenses.

In some embodiments of the invention, the elements of the component images may be flipped before being used to form the composite image. Flipping portions of the component images changes the direction in which these portions appear to float when seen through the decoder. By alternating between flipping and not flipping the elements of the component images, different parts of the component images may appear to float in opposite directions when seen through the decoder.

In certain instances, the above effects may be applied to a single component image (or two identical component images) that is used to produce a non-tonally balanced encoded image. Such images could be used, for example, in applications where a decoder lens is permanently affixed to the composite image. In such applications, tonal balancing is unnecessary because the latent image is always viewable through the permanently affixed decoder.

According to one example, a composite image may be formed from more than one latent (or other) image. For each such composite image, a plurality of component images may be created using the methods previously discussed. Portions from each component image may then be used to form a single composite image. For example, if it is desired to use two latent images (Image 1 and Image 2), each latent image could be used to form two component images. The two component images may each be divided into elements and subelements as shown in FIGS. 4-6. This would produce four component images, each having corresponding elements and subelements. A composite image similar to those of FIGS. 5A and 5B could be formed using a subelement A1 taken from a first component of Image 1 and a subelement A2 taken from a second component of Image 1. Similarly, a subelement B1 could be taken from a first component of Image 2 and a subelement B2 from a second component of Image 2. In another example, subelements A1 and B2 could be taken from components of Image 1 and subelements B1 and A2 could be taken from components of Image 2. The subelements could be ordered in multiple ways. For example, the subelements could be ordered one below another, side by side, across the diagonal from each other, or in any other way. The composite image may produce the effect that the human observer may see the different latent images depending on the angle of view through the decoder. The component images may alternate and switch when the angle of view is changed. Additionally, the zoom factor and flipping techniques may be used with this technique. This may create a multitude of effects available to the designer of the composite image. Any number of latent images may be hidden together in this manner and any number of component images may be used for each.

According to another example, different zoom factors can be used for the subelements that are obtained from the different images. For example, a zoom factor of two may be used for the subelements obtained from Image 1 and a zoom factor of eight may be used for the phases obtained from Image 2. The subelements obtained from the different images may appear to be at different depths when seen through the decoder. In this way, various 3D effects may be achieved.

Figure 8:
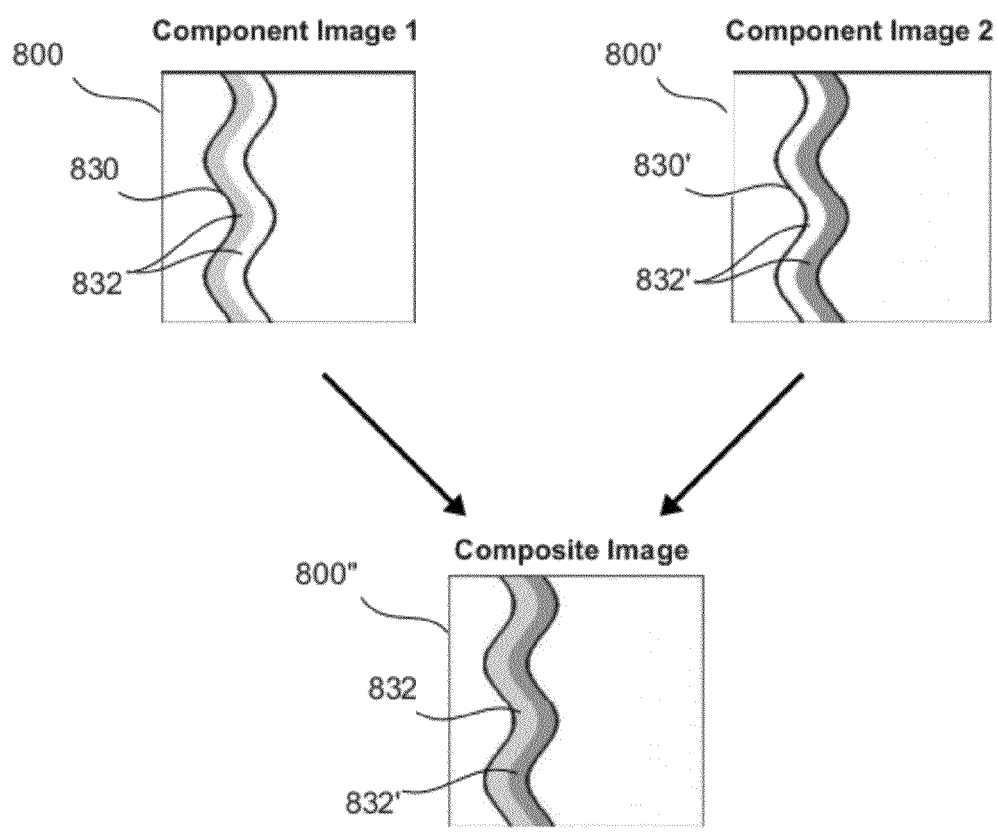
FIG. 8 is a schematic representation of component images used to produce a composite image according to an embodiment of the invention.

FIG. 8 illustrates an approach to collecting and ordering portions of the component images to form elements of a composite image that is decodable using a lenticular lens. In FIG. 8, two component images 800, 800' are divided into elements 830, 830' corresponding in shape and frequency to the features of a decoder having "wavy" lenticules. As before, the component images are created so as to be balanced around a particular shade (or shades). The composite image 800" is again formed by assembling subelements 832, 832' from the component images 800, 800'. A zoom factor can be used if desired. In this example, the zoom factor is one, which indicates that the composite image elements are the same size as the component image elements (i.e., the component image elements are not shrunk). The approaches of collecting and ordering discussed herein may also be applied for a wavy decoder or any other type of decoder. In this example, the portion of the first component image, which is the light gray portion, may be taken from the same geometrical position as the portion of the second component image, which is the dark gray portion. The portions of the component images may have equal size. The combined portions of the component images or the elements of the composite images may cover the area of a single decoding feature in the composite image.

If the portions of the component images used to create a composite image are sufficiently small and if the phases are balanced along the same color shade, the techniques described herein may produce an image that looks like a tint, i.e. uniform color shade, when printed.

Figure 9:
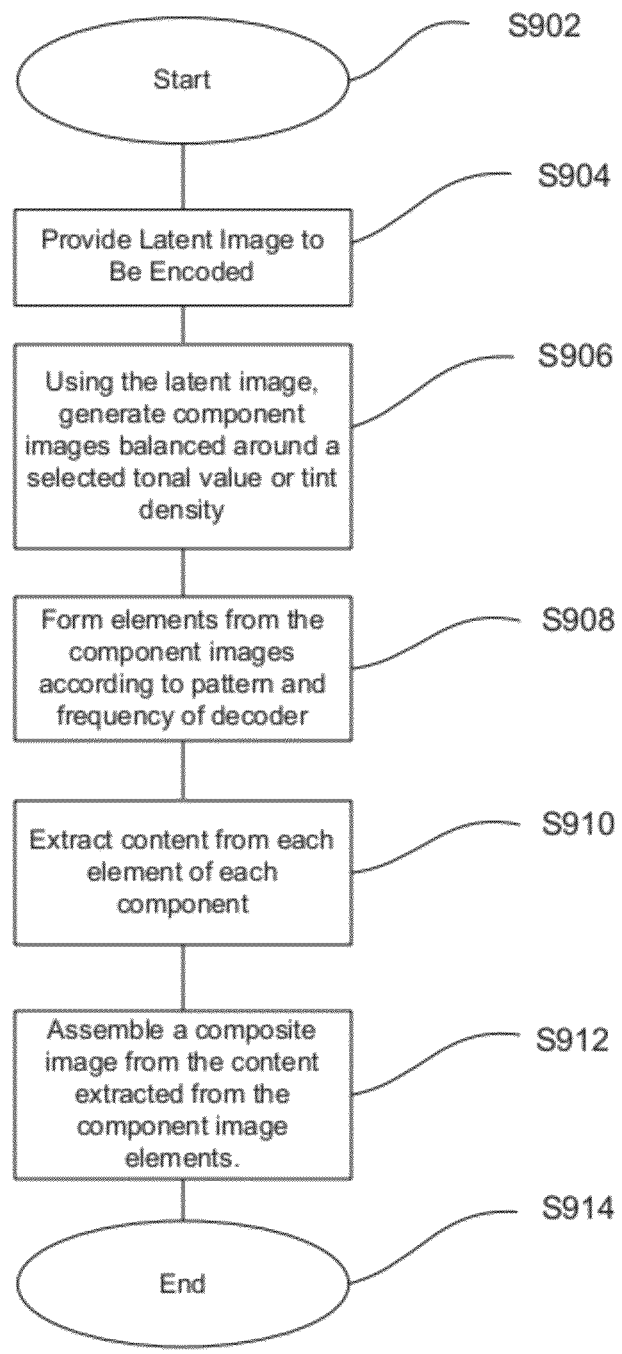
FIG. 9 is a flow diagram of a method of producing a composite image incorporating a latent image according to an embodiment of the invention.

FIG. 9 illustrates a generalized method 900 of producing a composite image according to an embodiment of the invention. The method 900 begins at S902 and at S904 a latent image is provided. Using the latent image, two or more component images are created at S906. As previously discussed, these component images are formed so that at each position, the tonal values are balanced around a selected tonal value or tint density. At S908, the image components are used to produce a plurality of image elements to be used to form a composite image. These composite image elements are formed and positioned according to a pattern and frequency of the features of a decoder. As previously discussed, the component elements may be positioned and sized based on a frequency that matches or is a multiple of the frequency of the decoder. In some embodiments, the component image elements are constructed by dividing the composite image into non-overlapping elements or cells. In other embodiments, the component image elements may be formed as overlapping elements or cells.

At S910, content from each element of each of the component images is extracted. In embodiments where the component images are divided into non-overlapping elements, the action of extracting content may include subdividing each element of each component image into a predetermined number of subelements. The image content from the subelements is then extracted. The subelements from which content is extracted may be the inverse of the number of component images or a multiple thereof. Thus, if two component images are used, then half of the subelements are extracted from each element.

In embodiments where the component images are used to produce overlapping elements, the content of each element may be extracted. As previously described, a zoom factor may be applied to the extracted elements to produce subelements that can be used to form the composite image.

At S912, the extracted content from the component images is used to form a composite image. This may be accomplished by placing subelements from each of the components into positions corresponding to the positions in the component images from which the content of the subelements was extracted. The method ends at S914.

Any or all of the steps provided in method 900 and any variations may be implemented using any suitable data processor or combination of data processors and may be embodied in software stored on any data processor or in any form of non-transitory computer-readable medium. Once produced in digital form, the encoded composite images may be applied to a substrate by any suitable printing, embossing, debossing, molding, laser etching or surface removal or deposit technique. The images may be printed using ink, toner, dye, pigment, a transmittent print medium, as described in U.S. Pat. No. 6,980,654, which issued Dec. 27, 2005 and is incorporated herein by reference in its entirety; a non-visible spectrum (e.g., ultraviolet or infrared) print medium as described in U.S. Pat. No. 6,985,607, which issued Jan. 10, 2006 and is incorporated herein by reference in its entirety.

It will be understood that there are a variety of ways in which balanced image components may be constructed. In various embodiments, balanced component image portions may be created by inverting the portions of one component image to form the portions of the second component. If this approach is used, the component images may be balanced around 50% density, and the composite image will appear to the naked eye as a 50% tint. When printed or otherwise displayed, the elements of the composite image may be printed next to each other and the eye will average them out to (60%+40%)/2=50%. Another example for generating the composite image includes digitally encoding a darkened and brightened version of the color latent image. One component can be darkened by using the intensity/color curve designed for darkening, and the other component can be brightened in each location by the same amount as the first component was darkened. An alternative technique for blending colors into the composite image include transforming a color image into a color space that separates the image into intensity and color components, such as Lab, Yuv, or HSi color space, and applying intensity/color curves as mentioned above in these color spaces. Other color spaces may be used.

In some embodiments of the invention, a tint based composite image may be integrated or embedded into a visible image, such as any visible art. The composite image(s) may be hidden to the naked eye within the visible image, but rendered not hidden when a decoder is placed on the printed visible image or composite image. All of the effects associated with the composite image (i.e. the appearance of floating, alternation of component image viewability, etc.) may be retained.

One approach to this is to apply a halftone screening technique as discussed above that uses the composite images as a screen file to halftone the visible image. This technique may modify the elements of the composite image by adjusting the size of the element to mimic the densities of the pieces of the visible image at the same positions. In this method, the composite image has no more than two intensity levels in each of its color separations. The corresponding color separations of the composite image are used as screens for the visible image. If the color components of the composite image are not bilevel, they can be preprocessed to meet this requirement.

Figure 10:
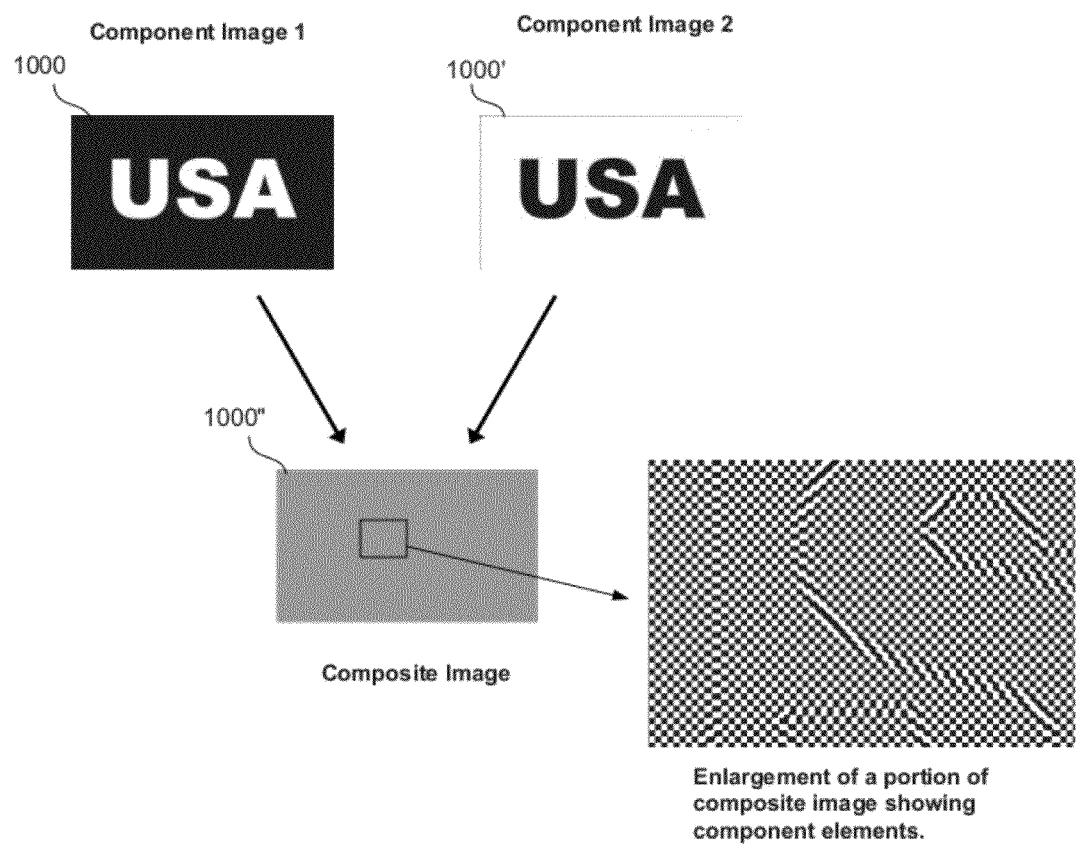
FIG. 10 is an illustration of component images used to produce a composite image according to an embodiment of the invention.
Figure 11:
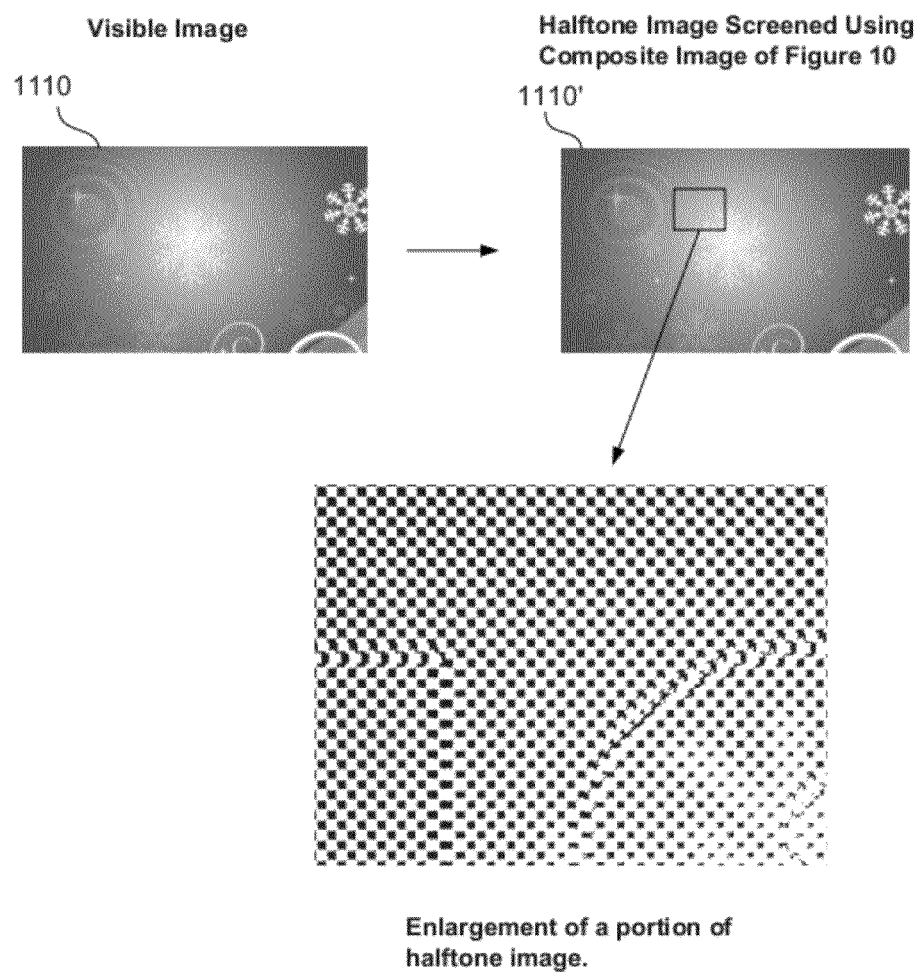
FIG. 11 is an illustration of a composite image formed from a visible image screened using the composite image of FIG. 10 in accordance with a method according to an embodiment of the invention.

FIGS. 10 and 11 illustrate an example of this approach. FIG. 10 illustrates two component images 1000, 1000' constructed based on a block letter "USA" latent image, which are used to construct a composite image 1000" formed from square elements of the two component images 1000, 1000'. As discussed herein, the basic composite image appears as single tone image to the naked eye. Magnification, however, shows that the composite image 1000" is formed from a plurality of subelements. Each of these subelements is a square portion taken from a corresponding element of one of the component images 1000, 1000'. It will be understood that all of these subelements are the same size and shape. The appearance of varying sized rectangles in the enlarged area occurs as the result of the variation in content within the subelements. Placement of a corresponding decoder over the composite image 1000" "reassembles" this content so that the component images 1000, 1000' with the latent image can be viewed.

FIG. 11 illustrates a visible image 1110 along with a halftone 1110' of the same image screened using the composite image 1000" of FIG. 10. The unmagnified half-tone image 1110' appears unchanged to the naked eye. Magnification, however, shows that the image 1110' is made up of the square elements of the composite image, which have been modified according to the tone density of the original image 1110. In effect, the composite image 1000" of FIG. 10 is embedded within the visible image 1110. When a decoder is placed over the encoded image (i.e., the halftone artwork 1110'), the component images 1000, 1000' will be visible.

Figure 12:
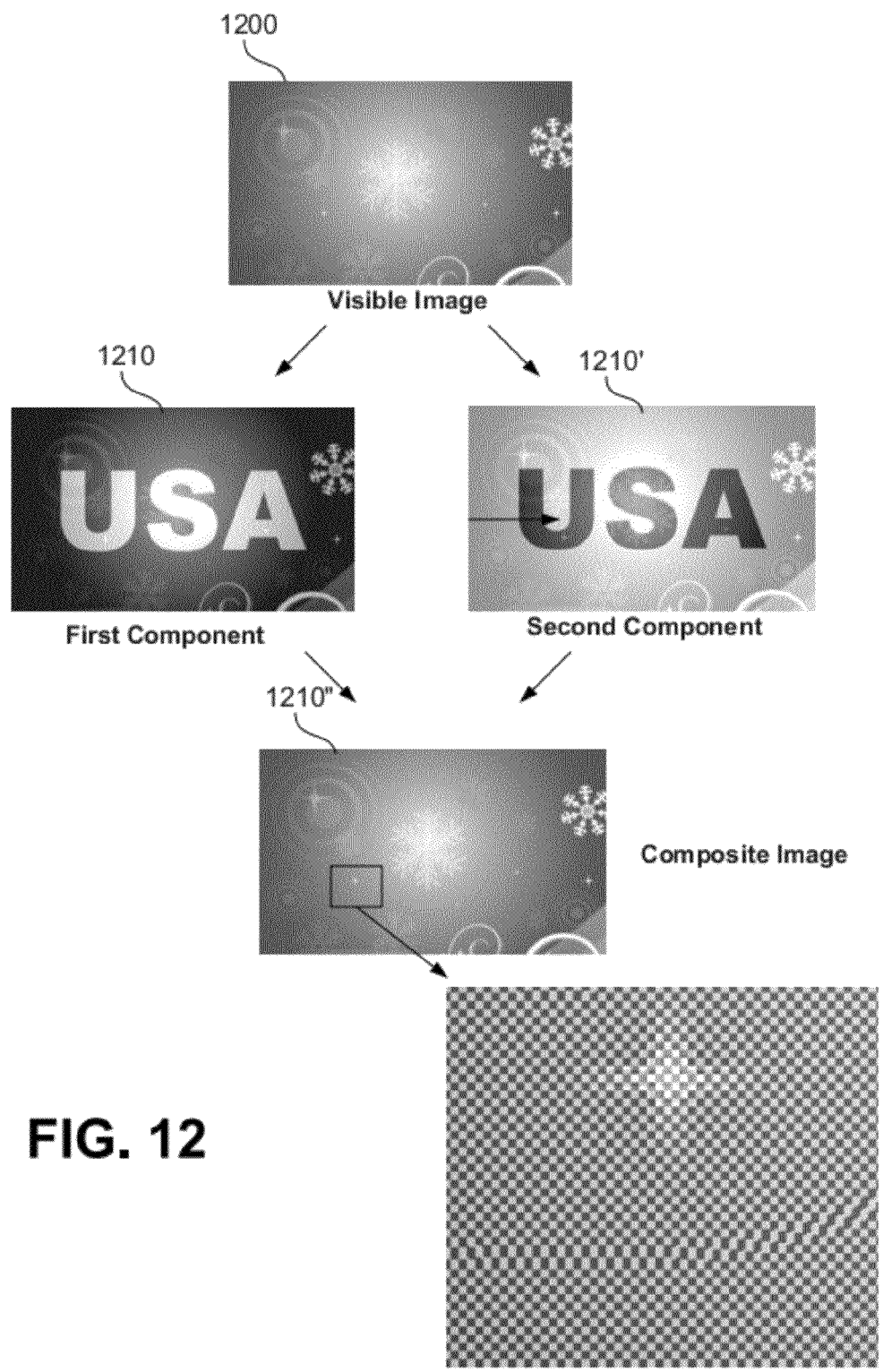
FIG. 12 illustrates component images formed from a visible image and used to produce a composite image using a method according to an embodiment of the invention.

FIG. 12 illustrates another approach to hiding a latent image within a visible image 1200. As was previously discussed, component images 1210. 1210' may be formed by tonally balancing corresponding positions around different tone densities in different areas. This approach can be used to create component images 1210, 1210' from a visible image 1200 as shown in FIG. 12. One approach is to darken the visible image 1200 to create a first replica image and correspondingly lighten the visible image 1200 to create a second replica image. An area matching a latent image may be masked from each of the replica images and replaced in each case by the content from the masked area of the other replica. In the example illustrated in FIG. 12, the areas of the visible image 1200 that align with the letters "USA" (i.e. the latent image) are essentially swapped between the replica images to produce the component images 1210, 1210'. The component images may then be sampled and combined to create the composite image 1210" using any of the techniques discussed herein. The composite encoded image 1210" closely resembles the original primary image 1200, but with the hidden message "USA" being viewable using a decoder corresponding to the size and configuration of the elements used to form the subelements of the composite image 1210".

Figure 13:
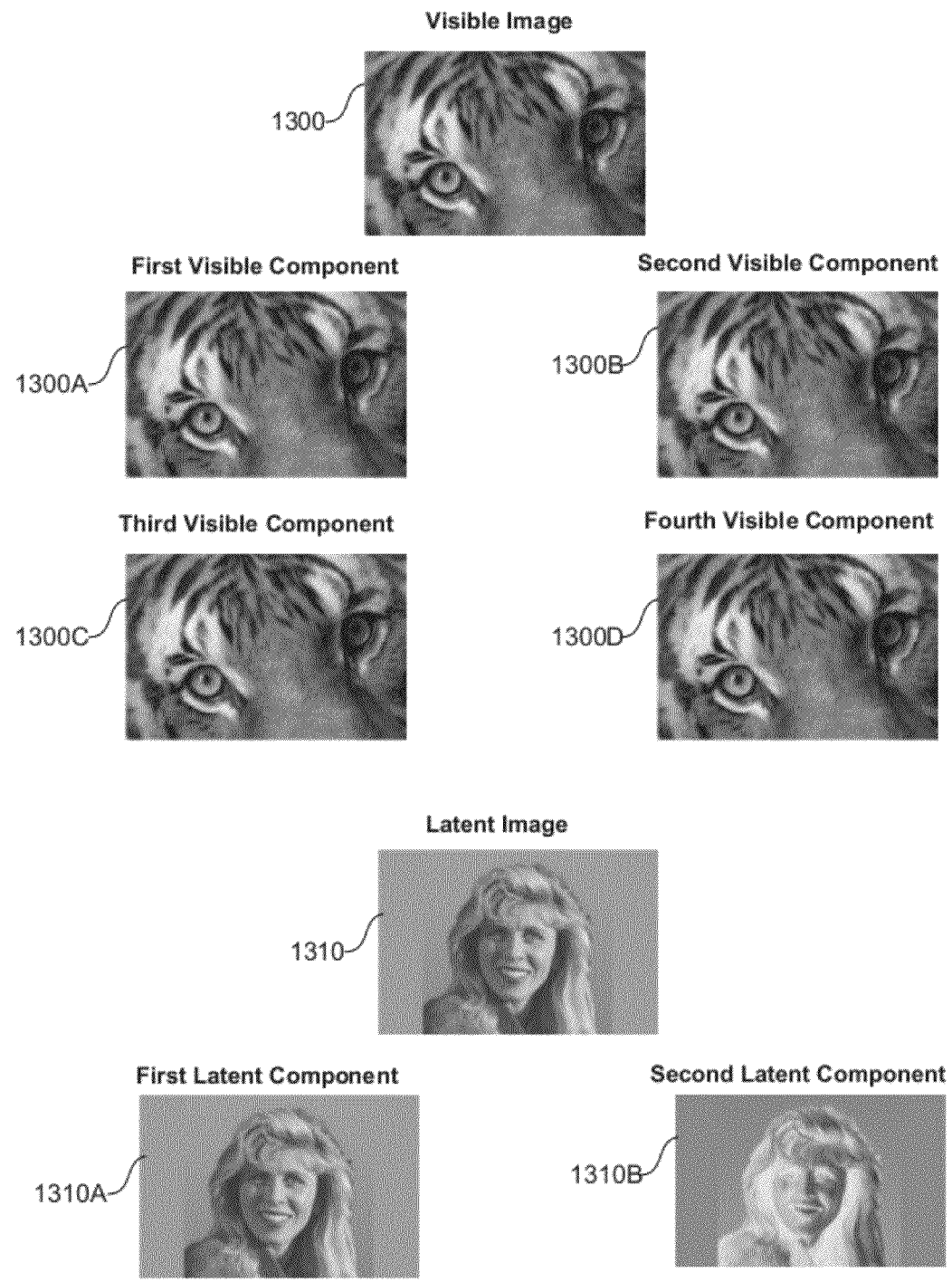
FIG. 13 illustrates visible and latent component images used to produce a composite image using a method according to an embodiment of the invention.
Figure 14:
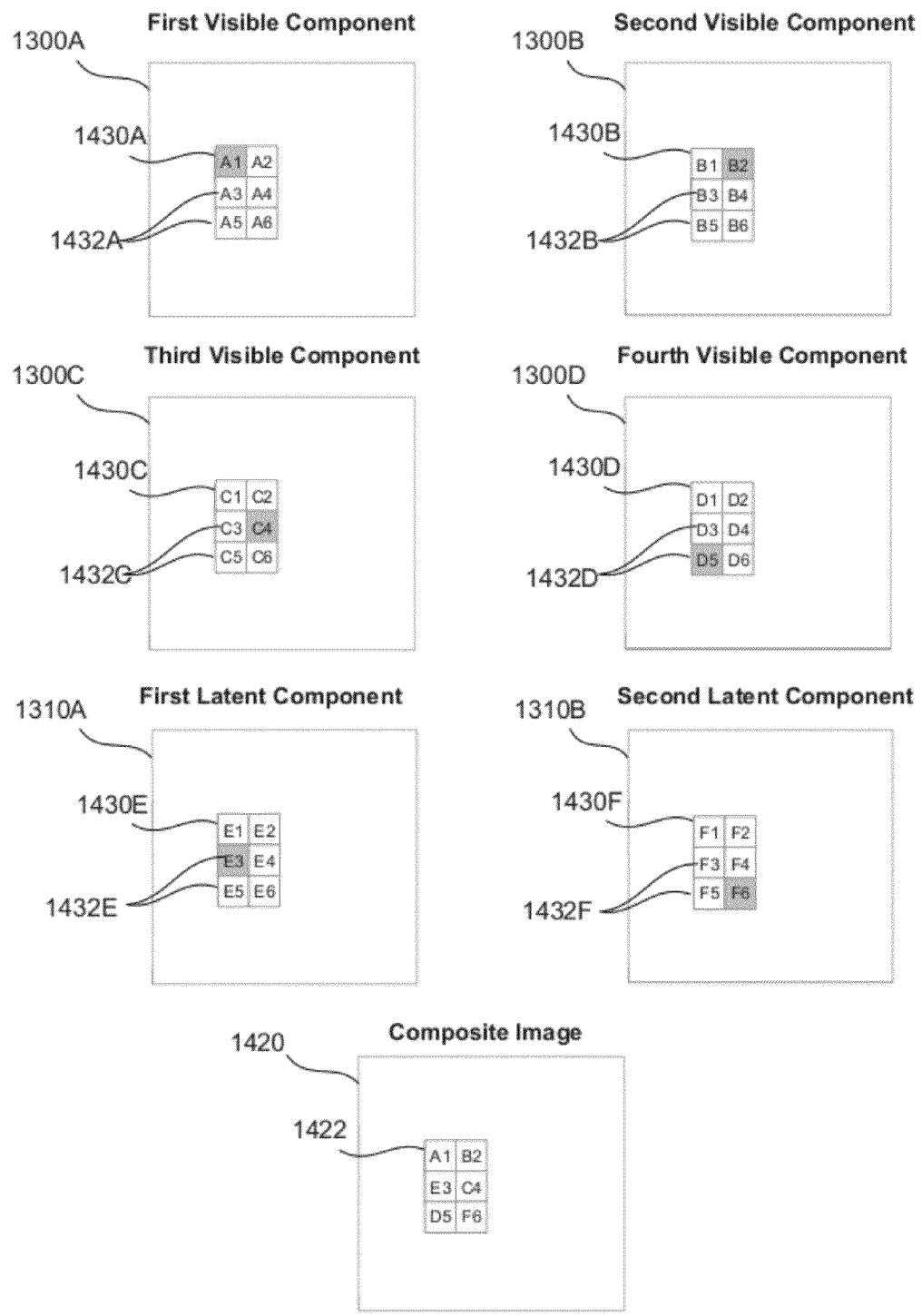
FIG. 14 is a schematic representation of the elements of a series of component images used to produce a composite image using a method according to an embodiment of the invention.

Another approach to hiding a latent image within a visible image is to use both the visible and latent images to create corresponding component images. This approach is illustrated in FIGS. 13 and 14. FIG. 13 illustrates (in gray scale) a color visible image 1300 of a tiger, and a color latent image 1310 of a girl. In this example, the visible image 1300 is used to form four identical component images 1300A, 1300B, 1300C, 1300D, which are divided into elements 1430A, 1430, 1430C, 1430D as shown in FIG. 14. A matching decoder may include a rectangular or elliptical lens, for example. As in previous examples, only a single element is shown for each component image, but it will be understood that the elements are formed over the entire component image. It will also be understood that, for demonstration purposes, the elements in FIG. 14 are depicted much larger than actual elements used in the methods of the invention. In the illustrated embodiment, each of the elements of the four components is divided into subelements 1432A, 1432B, 1432C, 1432D. Because, in this example, a total of six components are used to produce the composite image, the component image elements are divided into six subelements.

It will be understood that, in practice, it is not actually necessary to create separate component images of the visible image. The visible image itself can be used to produce the elements and subelements used to construct the composite image.

The latent image 1310 is used to produce two corresponding component images 1310A, 1310B. The second component image 1310B is produced as an inverse of the first component image 1310A. The first and second component images 1310A, 1310B are divided into elements 630E, 630F, which may be non-overlapping elements (as shown in FIG. 11) or as overlapping elements like those shown in FIG. 3. As with the component images that correspond to the visible image, each of the elements of the latent components 1310A, 1310B is divided into subelements 1432E, 1432B, 1432C, 1432D. Again, six subelements are formed from each element.

In this example, the goal is for the visible image to be visible to the naked eye and the latent image to be visible with the assistance of a decoder, which is configured to correspond to encoding parameters, including a frequency of the elements extracted from the visible and latent component images 1300A, 1300B, 1300C, 1300D, 1310A, and 1310B. Thus, in constructing the composite image, the majority of the subelements used are taken from the visible component images 1300A, 1300B, 1300C, and 1300D that correspond to the visible image. In the illustrated example, four subelements (A1, B2, C4 and D5) of the six subelements used in each element 1422 of the composite image 1420 are extracted from the four visible component images 1300A, 1300B, 1300C, and 1300D that correspond to the visible image. The other two subelements (E3 and F6) used in the element 1422 are extracted from the latent composite images 1310A, 1310B that correspond to the latent image. The subelements E3 and F6 are interlaced with the four subelements A1, B2, C4, and D5 extracted from the visible image. Because the subelements E3 and F6 extracted from the latent image are compensated such that an original image tint for one subelement is exchanged with an inverse image tint for the other subelement, the subelements E3 and F6 will not be visible to the naked eye. In other words, the eye will mix up the corresponding subelements E3 and F6 into a 50% tint. As in previous embodiments, the subelements used and their placement within the element 1422 of the composite image 1420 can vary.

Because the subelements that originate from the visible image 1300 are not changed in any way, an observer will still see the image of the tiger in the composite image 1420 with a naked eye. Under a properly oriented decoder, however, the composite image elements will be visually grouped so that, for some angles of view, the observer will see the visible image 1300 (e.g., the tiger of FIG. 13), for other angles of view, the observer will see the latent image 1310 (e.g., the girl of FIG. 13), and for yet other angles of view the observer will see the inverse of the latent image 1310. In this way, the color latent image 1310 and its inverse are hidden inside the color visible image 1300. Additional effects may be added to the decoded image by applying element flipping and/or a zoom factor larger than one to the latent component images 1310A, and 1310B generated from the latent image 1310.

In a variation to the above embodiment, instead of using a majority of subelements from the visible image 1300 for each composite image subelement A1, B2, C4, D5, E3 and F6, the visible image 1300 can be preprocessed to increase its contrast. This allows the reduction of the number of subelements that are extracted from the visible image 1300 in order to hide the latent image 1310.

In any of the embodiments described herein, the visible and latent images used to create a composite image may be binary, grayscale, color images, or a combination of any type of image. In this way, the component images revealed with the decoder may be binary, grayscale or color images.

A Multi-Layered Decoder that Simultaneously Decodes Latent Image Color Components As described herein, the composite image may include latent images that are encoded into a visible image using two or more color components. While the composite image may include multiple color components, the color components may be blended to generate a monotone image. For example, blending equal amounts of Cyan tint, Magenta tint, and Yellow. Techniques described herein enable encoding and decoding of color latent images from seemingly uniform visible images. The visible images include content variations such that the observer cannot correlate the colors revealed with the decoding device with colors seen by the unaided eye. According to one example, the latent images are divided into at least two color component separations that correspond to color components that are available in the visible image. The color separated latent images are encoded into the corresponding color components of the visible image based on encoding parameters that are determined by features of the matching decoder. For example, the encoding parameters may include a relative angle for depositing a particular color component and a frequency of decoding elements, such as lenses, used to decode the composite image, among other encoding parameters.

Figure 16:
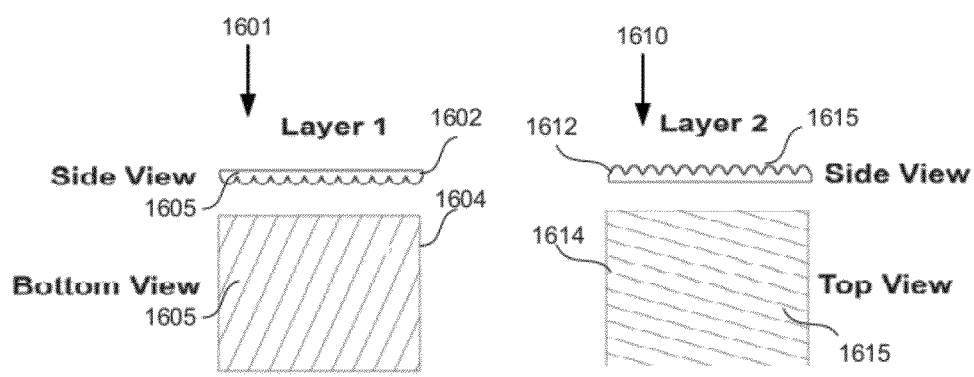
FIG. 16 illustrates a side view, bottom view and top view for a decoder having two layers according to an embodiment of the invention.

FIGS. 16 and 17 illustrate examples of multi-layer decoders, or rendering devices, having two layers. The elements (or lenticules) in each layer of the multi-layer decoder are arranged according to a selected frequency or pattern of the corresponding latent image color component. The elements (or lenticules) in each layer of the multi-layer decoder are further oriented to match the relative angle in which the latent image color component was deposited onto the substrate. When the encoding parameters of the latent image are matched to the features of the corresponding rending layers, each layer of the latent image may be simultaneously decoded. One of ordinary skill in the art will readily appreciate that more than two rendering devices may be used to simultaneously decode latent images associated with more than two color components.

FIG. 16 illustrates components of a two layer decoder. The first rendering device 1601 is shown in a side view 1602 and a bottom view 1604. The second rendering device 1610 is shown in a side view 1612 and a top view 1614. As shown by the adjacent placement of the first rendering device 1601 and the second rendering device 1610 in FIG. 16, the first layer elements 1605 are oriented approximately perpendicular to the second layer elements 1615. It follows that the two color component layers associated with the two latent images are oriented to match the angle of the corresponding first layer elements 1605 and the second layer elements 1615. Therefore, each layer of the latent images is decoded simultaneously to provide a multi-color decoded image.

While the first rendering device 1601 and the second rendering device 1610 are illustrated to include linear lenses, one of ordinary skill in the art will readily appreciate that the first rendering device 1601 and/or the second rendering device 1610 may include non-linear lenses. Non-linear lens structures may include a wavy line structure, zigzag structure, fish bone structure, arc-like structure, a free-hand shaped structure, or the like. According to one example, the first rendering device 1601 and the second rendering device 1610 may include a same lens structure or different lens structures. Furthermore, the multi-layered lens may include layers formed using different technologies, such as having a first layer formed using a molded lens array and a second layer formed using a silkscreen printing process.

Figures 17A, 17B, 17C:
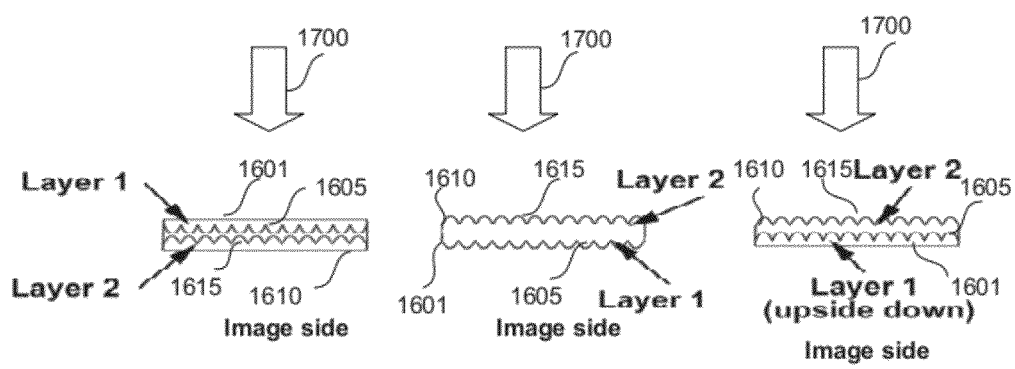
FIGS. 17A-17C illustrate different configurations for a two layer decoder according to an embodiment of the invention.

As illustrated in FIGS. 17A-17C, the first rendering device 1601 and the second rendering device 1610 may be positioned in various configurations relative to each other. The arrow 1700 shows the direction of view. As illustrated in FIG. 17A, the first rendering device 1601 and the second rendering device 1610 may be positioned so that the first layer elements 1605 and the second layer elements 1615 face inwardly toward each other. When the first layer elements 1605 are oriented toward the image, the first layer elements 1605 will decode the image through the second rendering device 1610. In this case, the second rendering device 1610 will be positioned to physically contact the encoded image.

In a second example illustrated in FIG. 17B, the first rendering device 1601 and the second rendering device 1610 may be positioned so that the first layer elements 1605 and the second layer elements 1615 face outwardly away from each other. In this configuration, the first rendering device 1601 may be positioned slightly above the encoded image to enable the first layer elements 1605 to focus on the encoded image.

In a third example illustrated in FIG. 17C, the first rendering device 1601 and the second rendering device 1610 may be oriented in a same direction so that both the first layer elements 1605 and the second layer elements 1615 face upward. In this case, the curvature of the first layer elements 1605 and the second layer elements 1615 may be designed so that the first layer elements 1605 and the second layer elements 1615 focus on the bottom surface of the multi-layered decoder.

In the above examples, the frequency of the first layer elements 1605 and the second layer elements 1615 may be the same or different. For example, the frequency of the first layer elements 1605 and the second layer elements 1615 may be 250 lines per inch. Alternatively, the frequency of the first layer elements 1605 and the second layer elements 1615 may be 200 lines per inch for Layer 1 and 250 lines per inch for Layer 2.

A Single-Layer Decoder that Simultaneously Decodes Latent Image Color Components As described herein, the composite image may include latent images that are encoded into a visible image using two or more color components. While the composite image may include multiple color components, the color components may be blended to generate a monotone image. For example, blending equal amounts of Cyan tint, Magenta tint, and Yellow tint creates an image that appears to have a uniform brown tone. Techniques described herein enable encoding and decoding of color latent images from seemingly uniform visible images, or visible images with variations in their content where the observer cannot correlate the colors shown with decoding device with colors seen by naked eye.

According to one example, the latent images are divided into at least two color component separations that correspond to color components that are available in the visible image. The color separated latent images are encoded into the corresponding color components of the visible image based on encoding parameters that are determined by features of the matching decoder. For example, the encoding parameters may include a relative angle for depositing a particular color component and a frequency of decoding elements, such as lenses, used to decode the composite image, among other encoding parameters.

Figure 18:
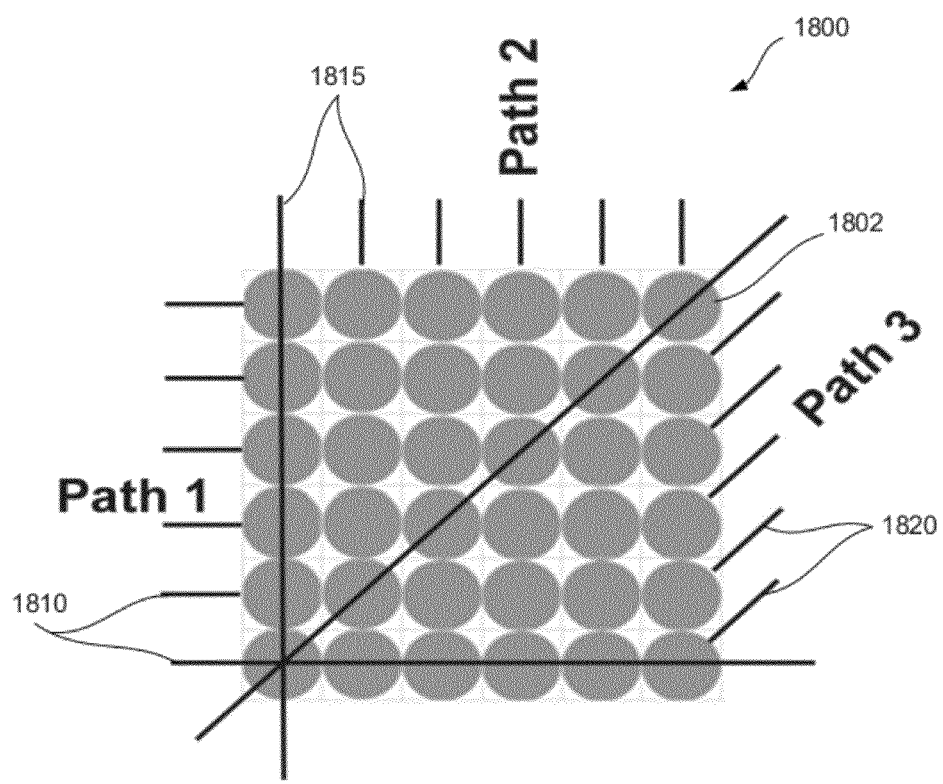
FIG. 18 illustrates an example single-layer decoder that simultaneously decodes latent image color components according to an embodiment of the invention.

FIG. 18 illustrates an example micro-array lens matrix 1800 configured provided on a single layer. The elements or micro-lens elements 1802 are arranged according to a selected frequency or pattern of the corresponding latent image color component. For example Path 1 (1810) and Path 2 (1815) are illustrated to have a same frequency, while Path 3 (1820) is illustrated to have a higher frequency. According to one example, frequency is controlled by adjusting a distance between rows of micro-array elements 1802 for a corresponding path. Increasing a distance between rows of micro-array elements 1802 may correspond to lowering a frequency, while reducing a distance between rows of micro-array elements 1802 may correspond to increasing a frequency. According to one example, the micro-lens elements 1802 may include a same lens structure or different lens structures.

The micro-lens elements 1802 are further oriented along one or more of Path 1 (1810), Path 2 (1815) and Path 3 (1820) to match the relative angle in which the latent image color component was deposited onto the substrate. While Paths 1-3 are illustrated to be linear paths, this disclosure supports non-linear paths. Non-linear paths may include a wavy line path, zigzag path, fish bone path, arc-like path, a free-hand shaped path, or the like. When the encoding parameters of the latent image are matched to the features of the single layer micro-array lens matrix 1800, each layer of the latent image may be simultaneously decoded. One of ordinary skill in the art will readily appreciate that more than three paths may be provided to simultaneously decode latent images associated with more than three color components. One of ordinary skill in the art will also readily appreciate that the micro-lens elements 1802 may be arranged in other matrix configurations that support multiple decoding paths with equidistant lens elements that match a frequency and angular orientation used for the encoding process. Such matrix configurations include a hexagonal grid configuration, concentric ring configuration, or other configurations.

According to another example, the encoding process may arrange micro-lens elements 1802 to support variable frequencies. In this case, the so that along a path, the distance between the micro-lens elements 1802 elements varies. According to one example, if the micro-lens elements 1802 are positioned along paths that correspond to linear paths used for the encoding process, then the micro-lens elements 1802 will sample the encoded image and recreate the latent image. By sampling pieces of the segments rather than decoding an entire segment of the encoded image, the decoded image may appear to be slightly jagged. However, if a frequency of the encoding process and a frequency of the micro-lens elements 1802 are sufficiently high, such as greater than 140 lines per inch, this effect may not be noticeable.

A Single-Layer Decoder that Simultaneously Decodes Frequency Sampled Color Components According to one example, the latent images are divided into at least two color component separations that correspond to color components that are available in the visible image. In this example, four color component separations are used and a linear lenticular decoding lens is provided to decode a four color component composite image.

Figure 19:
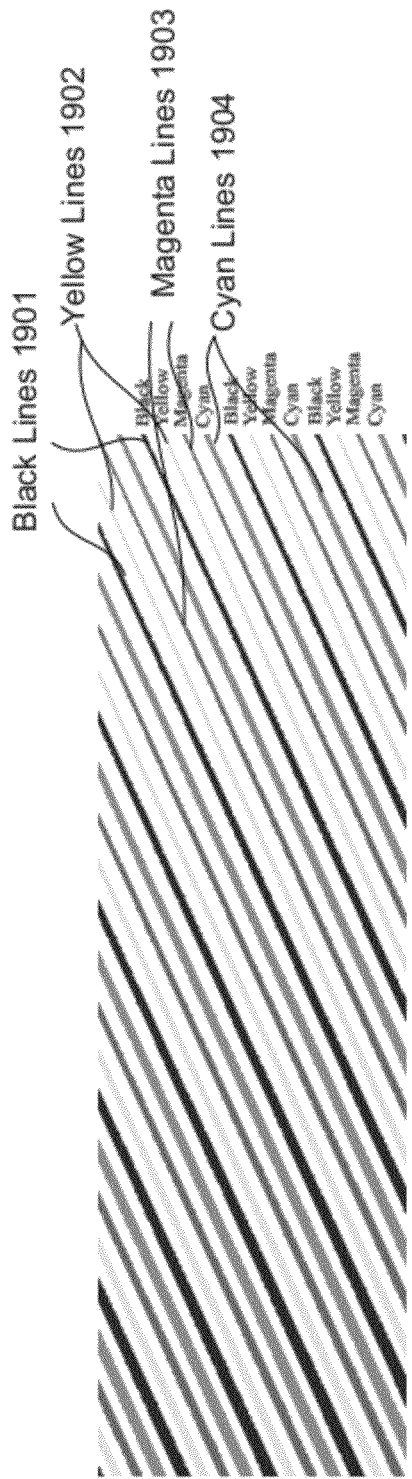
FIG. 19 illustrates an example of a single-layer decoder that decodes frequency sampled color components according to an embodiment of the invention.

As illustrated in FIG. 19, the lenticular lines used in the encoding process may be divided into four subsets that match the four color separations provided in the visible image and the latent image. The four subsets include black segments 1901, yellow segments 1902, magenta segments 1903, and cyan segments 1904. In other words, one fourth of the segments may be used to encode black separation, another fourth of the segments may be used to encode yellow separation, another fourth of the segments may be used to encode magenta separation, and the last fourth of the segments may be used to encode cyan separation.

According to one example, the subsets 1901, 1902, 1903, 1904 may be interleaved. For example, line numbers 1, 5, 9, 13, 17, etc. include the first subset of black segments 1901 corresponding to the black component. Line numbers 2, 6, 10, 14, 18, etc. include the second subset of yellow segments 1902 corresponding to the yellow component. Line numbers 3, 7, 11, 15, 19, etc. include the third subset of magenta segments 1903 corresponding to the magenta component. Line numbers 4, 8, 12, 16, 20, etc. include the fourth subset of cyan segments 1904 corresponding to the cyan component. The color components of the latent image are encoded into the appropriate subsets 1901, 1902, 1903, 1904. In this example, the frequency used for the encoding method is one fourth of the decoder frequency. In this example, a same encoding angle is applied to each of the subsets 1901, 1902, 1903, 1904.

In FIG. 19, an image is illustrated with cyan, magenta, yellow, and black color separations printed in a line screen at 25 degrees. Each color component of the visible image is encoded with the corresponding color component of the latent image. When the decoder is placed over the composite image, the decoder will simultaneously decode all color components, including the black component, the yellow component, the magenta component, and the cyan component. The decoded composite image reveals the composite color latent image.

This disclosure contemplates several variations to the above-described method. For example, rather than using a same frequency for all color components, more line repetitions may be used for one of the color separations. This will result in a higher frequency for the selected color separation. This disclosure further contemplates using different screening elements for different color separations. For example, straight segments may be used for some color separations and wavy segments may be used for other color separation. Another variation includes arranging lenticular lenses or micro-array lens elements to follow non-linear patterns, such as concentric rings pattern. Non-linear patterns may be produced by dividing the decoder elements into subsets. The number of subsets may match the number of the color components of the latent image and the color separations of the latent image may be encoded into these subsets.

According to one example, the frequency sampled color components would be applied to brighter images, including images having color separations within a 0-25% density range. This disclosure contemplates using any lens pattern to encode and decode color latent images, where different color components of the latent image are encoded into the elements of the visible image that match the designated subsets of the decoder pattern. Each of the color separations of the encoding image is printed using the same color separation from the latent image. For example, a cyan color separation of the latent image is encoded into the cyan color separation of the visible image.

Creating Rainbow Effects or Color Variations Using Multiple Latent Images

The above examples describe techniques for creating complex color latent images for encoding into a visible image. For example, the complex color latent images may include different color components provided within the composite image. The degree to which decoded color latent image matches the color latent image used for encoding depends significantly on the quality and resolution of the device used to apply encoded image to the articles.

For applications in which high quality and high resolution printers are not available, such as printing passport images encoding personal data, it may be difficult to achieve consistent match of the colors between color images used for encoding and color images decoded after applying images to the article. This may also be partly due to variation in the visible image (for example, every passport photo is different). In these cases, authentication may be accomplished, for example, by adding a second latent image that provides color variations or vivid color properties to an encoded composite image, without necessary requiring a good color match between desired and decoded color images. This encoding process may be performed at processing speeds that are comparable to the underlying processing speed needed to generate the personal information for embedding into the visible image.

To expedite the process of encoding color separations into the visible image, repetitive monochromatic latent images may be provided. As discussed herein, an inversion process may be used to manipulate the latent image or portions of the latent image. When the decoder is placed over the printed encoded visible image, color differences are discernible between the latent image and the surrounding visible image. Alternatively, a process may be provided for changing the brightness of the latent image or portions of the latent image before encoding the latent image into the particular color separation of the visible image. Changing the brightness of the latent image produces color differences between the latent images and the surrounding visible image that are discernible when the decoder is placed over the printed encoded visible image.

The processes of inverting latent images or changing the brightness of the latent image to encode the latent image into a visible image, such as a photograph, do not provide consistent results when applied to personal documents, such as passports and driver's licenses. One reason is that a subject's photographic image is unique so it follows that encoded photographic image may include unique color variations when decoded using the optical decoder. One technique that may be applied to standardize the process of authenticating personal documents includes providing a second latent image as described below.

Figure 15:
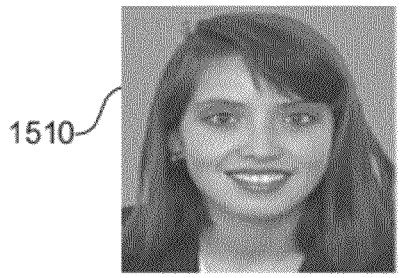
FIG. 15 illustrates a visible image and two latent component images used to produce a composite image using a method according to an embodiment of the invention.

FIG. 15 illustrates a visible image 1510 depicting a photograph of a subject, a first latent image having a first pattern that is generated using a red color component 1515, a first latent image having a first pattern that is generated using a blue color component 1520, and a second latent image 1525 having a second pattern that is generated using a green color component 1520. As illustrated, the content of the first latent images 1515, 1520 is different than the content of the second latent image 1525. One of ordinary skill in the art will readily appreciate that other content differences may be provided between the first latent image and the second latent image.

According to one example, the first latent image 1515 illustrates the block letters "JANE" which are rendered against a dark background, the block letters "JANE" being generated using a red color component. The first latent image 1520 illustrates the block letters "JANE" which are rendered against a dark background, the block letters "JANE" being generated using a blue color component. One of ordinary skill in the art will readily appreciate that different content may be provided for the first latent image.

The second latent image 1525 illustrates block letters "JANE" which are rendered against a white background 1527, the block letters "JANE" 1526 being generated using a green color component. The second latent image 1525 further illustrates block letters "JANE" which are rendered against a dark background 1528, the block letters "JANE" being generated based on the absence of ink. One of ordinary skill in the art will readily appreciate that different high contrast content may be provided for the second latent image.

Using the techniques described herein, the composite image 1530 is generated by encoding the latent images 1515, 1520, 1525 into the visible image 1530. Since the content provided in the second latent image 1525 offers more variations as compared to the content provided in the first latent images 1515, 1520, the color component of the second latent image 1525 introduces color variations in the encoded composite image 1530. As illustrated by the decoded image 1540, when the encoded composite image 1530 is viewed through a decoder, the variations in the green color component contributed by the second latent image 1525 combine with the red color component contributed by the first latent image 1515 and the blue color component contributed by the first latent image 1520. As a result, introducing the second latent image 1525 provides color variations and vivid color properties to an encoded composite image 1530. One of ordinary skill in the art will recognize that more than two latent images may be provided for encoding into the visible image. Furthermore, one of ordinary skill in the art will recognize that variations in the latent image can be introduced to any color component.

A Digital Decoding Device that Decodes and Concurrently Displays Latent Images Encoded Having Two or More Color Separations When the composite images produced according to the various embodiments of this disclosure are printed or otherwise associated with an article, the component images used to produce the composite images may be viewed by application of a corresponding decoder. For example, the decoder may include a software decoder programmed to decode and concurrently display two or more color separations that correspond to two or more component images. An example software decoder is described herein. The component images may be viewable through the use of a software-based decoder, such as those described in U.S. Pat. No. 7,512,249 ("the '249 Patent") and U.S.Pat. No. 7,630,513 ("the '513 Patent"), the complete disclosures of which are incorporated herein by reference in their entirety. As described in the '249 Patent and the '513 Patent, an image of an area where an encoded image is expected to appear can be captured using an image capturing device such as a scanner, digital camera, or telecommunications device and decoded using a software-based decoder. In some embodiments, such a software-based decoder may decode a composite image by emulating the optical properties of the corresponding decoder lens. Software-based decoders also may be used to decode a digital version of a composite image of the invention that has not been applied to an article.

According to one example, the latent image is divided into two or more color separations before being embedded within the visible image. The two or more color separations of the latent image may correspond to colors that are not present in the visible image. Thus, each color separation of the latent image may be encoded into different color separations of the visible image. For example, each color separation may be independently encoded into the visible image using encoding techniques described herein.

Figure 20:
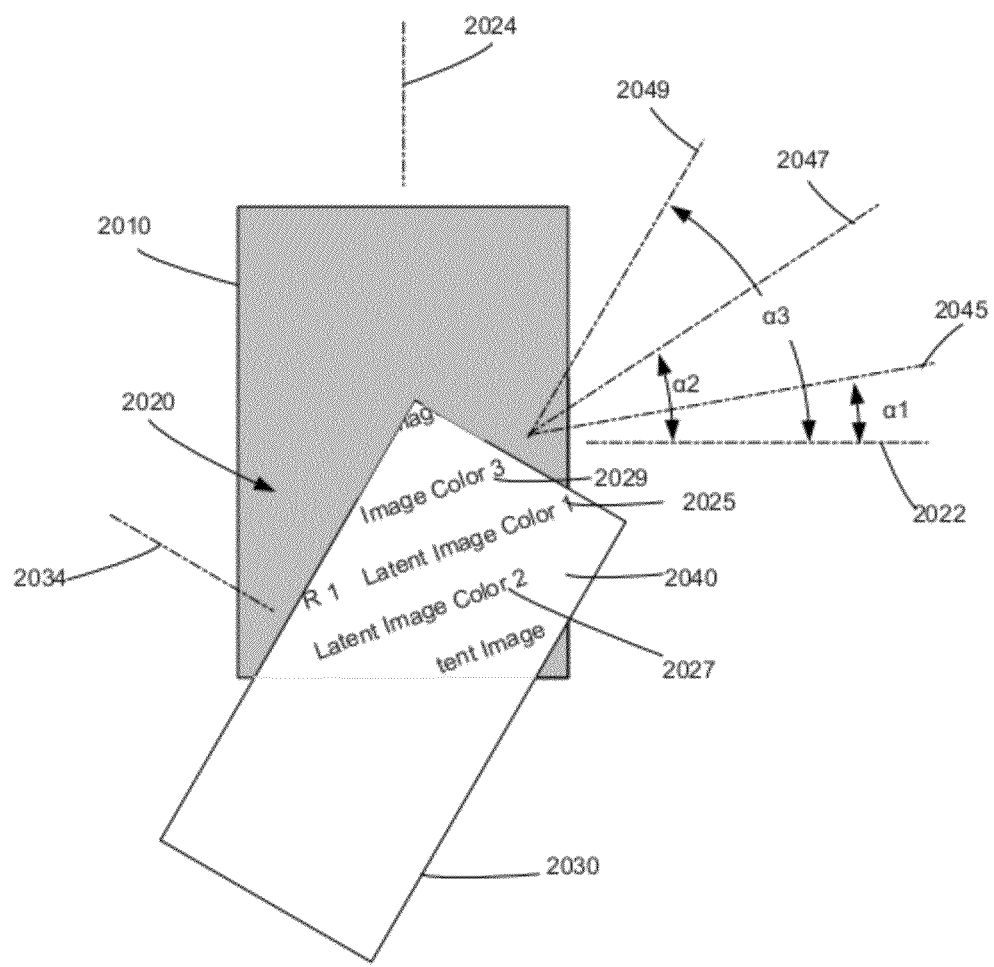
FIG. 20 illustrates a digital decoder that decodes and simultaneously displays latent images encoded having two or more color separations according to an embodiment of the invention.

In an alternative example illustrated in FIG. 20, the latent image color separations 2025, 2027, and 2029 may be encoded into multiple halftone screens that are positioned at different angles with respect to a horizontal line 2022. The different angles are represented by segments 2045, 2047, and 2049. The multiple halftone screens may be printed using a same color. For example, the line screens for the latent image may be printed using black ink. Additionally, for a latent image having three color separations, the red component may be encoded using a line screen oriented at $\acute{\alpha}1=15$ degrees; a green component may be encoded using a line screen oriented at $\acute{\alpha}2=30$ degrees; and a blue component may be encoded using a line screen oriented at $\acute{\alpha}3=60$ degrees. If bidirectional screens are used, such as a dot screen, two latent images may be encoded into one screen and oriented at a 90 degree angle relative to each other.

FIG. 20 illustrates a digitally encoded image 2010 that includes a visible image 2020 and a latent image having three corresponding color component separations 2025, 2027, and 2029. The visible image 2020 may be generated using black ink, gray-scale or multi-color ink. The color component separations 2025, 2027, and 2029 are embedded within the visible image 2020. According to one example, the color component separations 2025, 2027, and 2029 may be separately encoded and then merged or embedded into the visible image 2020. Alternatively, the process may be performed so that the color component separations 2025, 2027, and 2029 are encoded as they are embedded. In any event, the color component separations 2025, 2027, and 2029 are not viewable to an unaided eye without a software decoding device 2030.

According to one example for embedding or merging the latent image with the visible image, the visible image may be sampled to produce a visible image having a first periodic pattern at a first predetermined frequency. The latent image having two color components is then mapped to the visible image so that the first periodic pattern of the visible image is altered at locations corresponding to locations in the latent image having image content depicted with the two color components. The alterations to the visible image are sufficiently small that they are difficult for the unaided human eye to discern. However, when the software decoding device 2030 displays the encoded image at a frequency that correspond to the first predetermined frequency, the software decoding device 2030 captures the alterations in the visible image to display the latent image.

According to another approach for embedding or merging the latent image with the visible image, the first periodic pattern is first imposed on the latent image having two color components rather than on the visible image. In this case, the alterations are provided on the content that is associated with the latent image having two color components. The latent image is then mapped to the visible image and the content of the visible image is altered pixel by pixel based on the content of the encoded latent image. Other methods are available for embedding or merging the latent image with the visible image.

The software decoding device 2030 decodes the latent images 2025, 2027, and 2029 while displaying the encoded image 2010 on a graphical user interface ("GUI"). The digital decoding system 1800 described below and illustrated in FIG. 18 performs image processing and may be configured to assign a designated color to each latent image, including monochrome latent images. For example, three monochrome latent images may be provided within a visible image. A first monochrome latent image may be oriented at 15 degrees, a second monochrome latent image may be at 30 degrees, and a third monochrome latent image may be at 60 degrees. The software decoding device 2030 may be configured to detect the orientation of each monochrome latent image and assign a corresponding color component to the color separation. Accordingly, the software decoding device 2030 may assign a color red to the first monochrome latent image oriented at 15 degrees, a color blue to the second monochrome latent image oriented at 30 degrees, and a color green to the third monochrome latent image oriented at 60 degrees. The software decoding device 2030 may merge the designated colors to generate a composite color latent image for display to the user. For example, the assigned colors may be merged to yield a desired color shade. One of ordinary skill in the art will recognize that any combination of colors may be used and any desired color shades may be provided.

Figure 21:
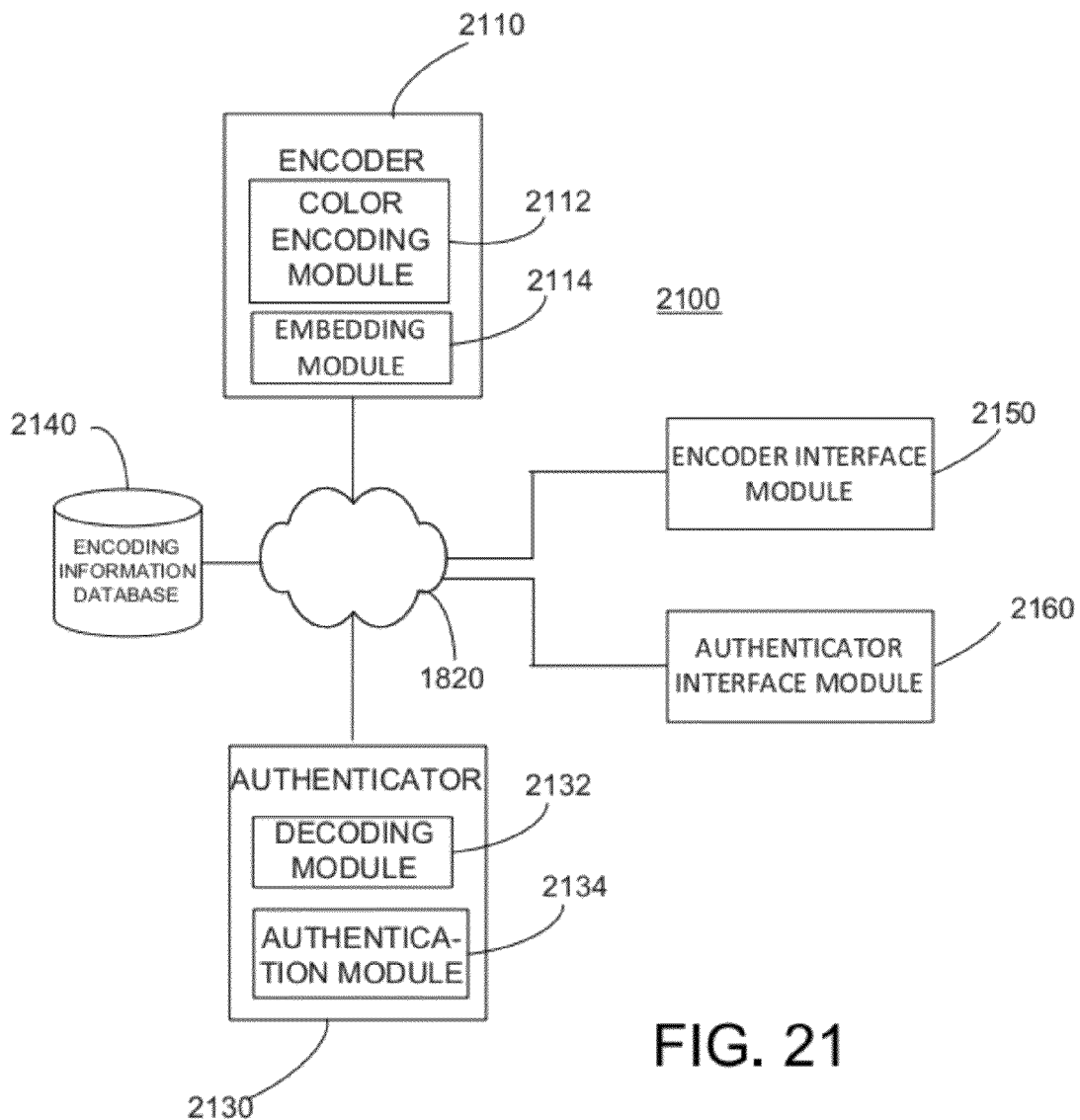
FIG. 21 illustrates a system for encoding and decoding images such that a composite image encoded with latent images two or more color components are simultaneously displayed according to an embodiment of the invention.

FIG. 21 illustrates an exemplary digital decoding system 2100 for authenticating an encoded image affixed to an article. An encoder device 2110 is provided to include an encoder module 2112 and an embedding module 2114 that communicate with an encoding information database 2140 via a network 2120. The encoder module 2112 and the embedding module 2114 are configured to perform encoding and embedding operations, respectively. The color encoding module 2112 also may be programmed to generate an encoded image to be affixed to the article, based on encoding parameters, the visible image, and the latent image. An encoder interface module 2150 is provided to serve as an interface between a user or document processing module (not shown) and the encoder device 2110. The color encoding module 2112 may be configured to store the encoding parameters, the visible image, and the latent image in the encoding information database 2140 for subsequent use in authenticating the digitally encoded image.

The color encoding module 2112 also may store the encoded image in the database 2140 and/or return the encoded image to the encoder interface module 2150. The color encoding module 2112 further may provide the latent image to the embedding module 2114, which is adapted to embed the latent image into the visible image. The encoded image with the embedded latent image may be returned to the encoder interface module 2150.

The software decoder or authenticator 2130 may include a decoding module 2132 and an authentication module 2134 that may be in communication with the encoding information database 440. The decoding module 2132 is adapted to retrieve the encoding parameters and/or the encoded image from the encoding information database 2140. The decoding module 2132 decodes the digitally encoded image using the encoding parameters. The decoding module 2132 also may be adapted to receive the encoded image to be authenticated and extract the latent image. The latent image may be obtained from an authenticator interface 460 that is adapted as an interface between an authentication requestor and the authenticator 2130. After decoding the encoded image, the decoding module 2132 may return the decoded image to the authenticator interface and/or forward the decoded image to the authentication module 2134. The authentication module 2134 is adapted to extract latent image from the decoded image for comparison to authentication criteria, which may be derived from multitude of image features, such as shape descriptors, histograms, coocurence matrices, frequency descriptors, moments, color features etc. The authentication module 2134 may further be adapted to determine an authentication result and return the result to the authenticator interface. The authentication module 2134 may include OCR software or bar-code interpretation software to extract information from the article. One of ordinary skill will understand that the color encoding module 2112, the embedding module 2114, the decoding module 2132, the authentication module 2134, the encoding information database 2140, the encoder interface module 2150 and the authenticator interface module 2160 may be distributed among one or more data processors. All of these elements, for example, may be provided on a single user data processor. Alternatively, the various components of the digital decoding system 2100 may be distributed among a plurality of data processors in selective communication via the network 2120.

Additionally, software-based decoders enable encoding of composite images using multiple color separations and geometrically complicated element patterns. Some lens element patterns and shapes may be difficult or impractical to physically manufacture as optical lenses. These difficulties, however, do not apply to the techniques used to create the images of the present invention and, moreover, do not apply to software-based decoders. The software-based decoder may be designed with flexibility to enable device users to adjust the decoding parameters. The methods described herein can make use of a "software lens" having lens elements that have a variable frequency, complex and/or irregular shapes (including but not limited to ellipses, crosses, triangles, randomly shaped closed curves or polygons), variable dimensions, or a combination of any of the preceding characteristics. The methods of the invention can be applied based on the specified lens configuration, even if this configuration cannot be physically manufactured. The methods of creating composite images from component images as described herein are based on the innovative use of geometric transformations, such as mapping, scaling, flipping etc, and do not require a physical lens to be created for this purpose. Providing a software-based lens configuration, or specification, allows a user to implement desired software lenses. Some or all of the characteristics of the software lens could then be used by a software decoder to decode the encoded composite image to produce decoded versions of the component images used to create the composite image.

The decoder also may include a rendering device that is configured decode the latent images. The rendering device may include a lens configured in any shape and having lens elements arranged in any pattern. For example, the lens may include lens elements arranged in a symmetrical pattern, an asymmetrical pattern, or a combination of both. The lens may further include lens elements that are arranged in a regular pattern or an irregular pattern.

Figure 22:
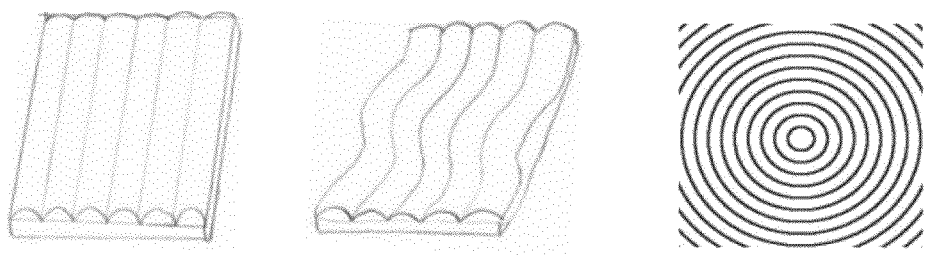
FIG. 22 illustrates lens element patterns that may be used to view images produced using a method of the invention.
Figure 22:
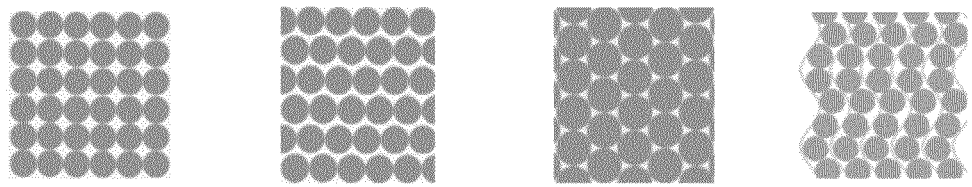

According to one example, the rendering device may include a lenticular lens having lenticules arranged in a straight line pattern, a wavy line pattern, a zig-zag pattern, a concentric ring pattern, a cross-line pattern, an aligned dot pattern, an offset dot pattern, a grad frequency pattern, a target pattern, a herring pattern or any other pattern. Alternatively, the rendering device may include lenses, such as a fly's eye lens, having a multidimensional pattern of lens elements. The multidimensional pattern may include a straight line pattern, a square pattern, a shifted square pattern, a honey-comb pattern, a wavy line pattern, a zigzag pattern, a concentric ring pattern, a cross-line pattern, an aligned dot pattern, an offset dot pattern, a grad frequency pattern, a target pattern, a herring pattern or any other pattern. Examples of some of these decoding lenses are illustrated in FIG. 22.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

While the foregoing illustrates and describes exemplary embodiments of this invention, it is to be understood that the invention is not limited to the construction disclosed herein. The invention can be embodied in other specific forms without departing from its spirit or essential attributes.

What is claimed is:

1. A computer-implemented method of encoding a latent image into a visible image based on encoding parameters, the latent image having two or more color components that are simultaneously revealed upon placing a decoder over an encoded image, the decoder having decoding parameters that match the encoding parameters, the method comprising:
generating, via a processor, a first image associated with a first color component, the first image having a first pattern of elements that are manipulated based on a corresponding color component provided in the latent image;
assigning a first angle to the first image;
generating a second image associated with a second color component, the second image having a second pattern of elements that are manipulated based on a corresponding color component provided in the latent image;
assigning a second angle to the second image;
aligning the first image by orienting the first pattern of elements according to the first angle;
aligning the second image by orienting the second pattern of elements according to the second angle; and
superimposing the aligned first image and the aligned second image to render the encoded image, the encoded image being visually similar to the visible image when viewed with an unaided eye.

2. The computer-implemented method of claim 1, wherein the first pattern of elements and the second pattern of elements are configured according to a first encoding frequency and a second encoding frequency, respectively.

3. The computer-implemented method of claim 1, wherein the first pattern of elements and the second pattern of elements are manipulated according to a phase shifting operation.

4. The computer-implemented method of claim 1, wherein superimposing the aligned first image and the aligned second image includes overlaying a first halftone screen patterned according to the first image and a second halftone screen patterned according to the second image.

5. The computer-implemented method of claim 1, wherein the first pattern of elements include at least one of a wavy structure, a zigzag structure, a fish bone structure, and an arc structure.

6. The computer-implemented method of claim 1, wherein the second pattern of elements include at least one of a wavy structure, a zigzag structure, a fish bone structure, and an arc structure.

7. The computer-implemented method of claim 1, wherein the first image and the second image are monotone images and the decoder assigns a color component during decoding.

8. A computer-implemented method of encoding a latent image into a visible image based on encoding parameters, the latent image having two or more color components that are simultaneously revealed upon placing a decoder over an encoded image, the decoder having decoding parameters that match the encoding parameters, the method comprising:
obtaining, via a processor, a latent image having at least two color components;
generating an inverse of the latent image having inverse color values;
determining a pattern of latent image elements for each color component of the latent image, the pattern including an element configuration and at least one element frequency corresponding to the decoding parameters, the latent image elements providing content information; and
constructing the encoded image having a pattern of latent image elements that include the at least one element frequency corresponding to the decoding parameters.

9. The computer-implemented method of claim 8, further comprising screening the visible image to produce a half-tone image of the visible image having the latent image incorporated therein, the latent image being non-viewable to an unaided eye, but viewable through the decoder when the decoder is placed over the encoded image.

10. The computer-implemented method of claim 8, further comprising a first screen of the half-tone image corresponding to the first color component, the first screen defining the first pattern of latent image elements to include a first frequency that is at least two times greater than the at least one element frequency.

11. The computer-implemented method of claim 10, further comprising a second screen of the half-tone image corresponding to the second color component, the second screen defining the second pattern of latent image elements to include the second frequency that is at least two times greater than the at least one element frequency.

12. The computer-implemented method of claim 8, wherein at least a portion of the latent image elements include a geometric shape selected at least one of a polygon, an ellipse, a partial ellipse, a circle, and a partial circle.

13. The computer-implemented method of claim 8, wherein the pattern of latent image elements for each of the component images includes at least one of a wavy structure, a zigzag structure, a fish bone structure, and an arc structure.

14. A computer-implemented method of encoding two latent images into a visible image based on encoding parameters, the latent images having different content that is associated with two or more color components to generate a color effect that is revealed upon placing a decoder over an encoded image, the decoder having decoding parameters that match the encoding parameters, the method comprising:
generating, via a processor, a first image associated with a first color component, the first image having a first pattern of elements that are manipulated based on a corresponding color component provided in the latent image;
generating a second image associated with a second color component, the second image having a second pattern of elements that are manipulated based on a corresponding color component provided in the latent image, the second latent image having different content than the first latent image; and
superimposing the first image and the second image to render the encoded image, the encoded image being visually similar to the visible image when viewed with an unaided eye.

15. The computer-implemented method of claim 14, wherein the first pattern of elements and the second pattern of elements are configured according to a first encoding frequency and a second encoding frequency, respectively.

16. The computer-implemented method of claim 14, wherein the first pattern of elements and the second pattern of elements are manipulated according to a phase shifting operation.

17. The computer-implemented method of claim 14, wherein superimposing the aligned first image and the aligned second image includes overlaying a first halftone screen patterned according to the first image and a second halftone screen patterned according to the second image.

18. The computer-implemented method of claim 14, wherein the first pattern of elements include at least one of a wavy structure, a zigzag structure, a fish bone structure, and an arc structure.

19. The computer-implemented method of claim 14, wherein the second pattern of elements include at least one of a wavy structure, a zigzag structure, a fish bone structure, and an arc structure.

20. The computer-implemented method of claim 14, wherein, the second latent image having different content than the first latent image renders the second color component as different from the first color component.

* * * * *